US012727980B2

(12) United States Patent
Prendergast et al.

(10) Patent No.: US 12,727,980 B2
(45) Date of Patent: Sep. 8, 2026

(54) ELECTRIC TOOTHBRUSH WITH CONTROLLED SUCTION AND IRRIGATION

(71) Applicant: DIGNITY HEALTH, San Francisco, CA (US)

(72) Inventors: Virginia Prendergast, Phoenix, AZ (US); Cynthia Kleiman, Scottsdale, AZ (US); Ronald Thatcher, King City (CA); Robert G. Dickie, King City (CA)

(73) Assignee: DIGNITY HEALTH, San Francisco, CA (US)

( * ) Notice: Subject to any disclaimer, the term of this patent is extended or adjusted under 35 U.S.C. 154(b) by 0 days.

(21) Appl. No.: 17/499,314

(22) Filed: Oct. 12, 2021

(65) Prior Publication Data

US 2022/0039928 A1 Feb. 10, 2022

Related U.S. Application Data

(63) Continuation of application No. 16/476,475, filed as application No. PCT/US2018/012752 on Jan. 8, 2018, now Pat. No. 11,141,248.

(60) Provisional application No. 62/443,986, filed on Jan. 9, 2017.

(51) Int. Cl.

| | |
|---|---|
| ***A61C 17/02*** | (2006.01) |
| ***A46B 9/04*** | (2006.01) |
| ***A46B 11/06*** | (2006.01) |
| ***A46B 13/02*** | (2006.01) |
| ***A61C 17/36*** | (2006.01) |
| *A61C 17/06* | (2006.01) |

(52) U.S. Cl.
CPC ............ *A61C 17/0208* (2013.01); *A46B 9/04* (2013.01); *A46B 11/06* (2013.01); *A46B 13/023* (2013.01); *A61C 17/36* (2013.01); *A61C 17/02* (2013.01); *A61C 17/06* (2019.05)

(58) Field of Classification Search
CPC ......... A61C 17/02; A61C 17/06; A61C 17/36; A61C 17/0208; A46B 13/023; A46B 11/06; A46B 9/04
USPC .......................................................... 15/167.1
See application file for complete search history.

(56) References Cited

U.S. PATENT DOCUMENTS

2007/0244425 A1 10/2007 Pond
2008/0196184 A1 8/2008 Mary T.
(Continued)

FOREIGN PATENT DOCUMENTS

JP 555624 B2 11/2015

*Primary Examiner* — Katina N. Henson
(74) *Attorney, Agent, or Firm* — Kolitch Romano Dascenzo Gates LLP

(57) ABSTRACT

A toothbrush for use by an operator and capable of being connected to a suction device and a syringe. The toothbrush includes a head, a handle, and a suction assembly. The head includes a plurality of bristles and an irrigation port configured to be in fluid communication with the syringe. The handle is coupled to the head and includes a user interface and a controller configured to actuate at least one of rotation, oscillation, and vibration of the plurality of bristles in response to feedback from the operator through the user interface. The suction assembly is coupled to one of the head and the handle and configured to be coupled to the suction device. The suction assembly includes a suction tip that is moveable relative to the head.

19 Claims, 25 Drawing Sheets

(56) References Cited

U.S. PATENT DOCUMENTS

| | | | | |
|---|---|---|---|---|
| 2009/0208900 | A1* | 8/2009 | Jew | A61C 17/022 433/92 |
| 2013/0237760 | A1* | 9/2013 | Adams | A61B 1/00135 600/146 |
| 2014/0147804 | A1* | 5/2014 | Yamamoto | A61C 17/0208 433/29 |
| 2015/0047134 | A1* | 2/2015 | Prendergast | A61C 17/22 15/4 |
| 2017/0258217 | A1* | 9/2017 | Zachar | A46B 15/0008 |
| 2017/0311707 | A1* | 11/2017 | Beck | A46B 15/0093 |
| 2017/0347790 | A1 | 12/2017 | Zachar et al. | |
| 2019/0117357 | A1 | 4/2019 | Boersma et al. | |

* cited by examiner

ELECTRIC TOOTHBRUSH WITH CONTROLLED SUCTION AND IRRIGATION

CROSS-REFERENCES

The following applications and materials are incorporated herein, in their entireties, for all purposes: U.S. patent application Ser. No. 16,476,475 filed on Jul. 8, 2019, now U.S. Pat. No. 11,141,248; U.S. Provisional Patent Application No. 62/443,986 filed on Jan. 9, 2017. However, such material is only incorporated to the extent that no conflict exists between the incorporated material and the statements and drawings set forth herein. In the event of any such conflict, including any conflict in terminology, the present disclosure is controlling.

BACKGROUND

The present application is directed to electric toothbrushes. In particular, the present application is directed to electric toothbrushes designed to accommodate or compensate for a wide variety of impediments to oral hygiene, such as restricted range of oral motion or access, or impediments to operation or interaction with traditional cleaning systems and methods, for example, such as may be common with hospitalized people, people living in residential care facilities, bedridden people, people generally dependent on others for oral hygiene, and many other patients.

While providing oral hygiene to those unable to provide their own care, such as, intubated patients is a technical challenge, doing so is vital for both patients' oral health and overall systemic health and disease prevention. For example, oral care in an ICU environment is difficult to perform due to physical barriers that hamper access to the oral cavity, such as endotracheal tubes, oral gastric tubes, and bite blocks. A patient's inability to swallow or expel toothpaste and/or rinsing fluid presents yet another obstacle in providing oral care in such environments. In some instances, individuals with impaired swallow, physical strength and mobility, or impaired cognition can be hampered in providing effective oral hygiene and can be dependent on others.

Various oral care protocols are provided for ICU, general hospital, and health care environments, though little evidence supports implementation of such protocols. For instance, manual toothbrushes have been proposed as the ideal method for promoting oral hygiene of orally intubated patients. Even though foam swabs appear to be inferior in removing oral debris and dried secretions compared to the recommended manual toothbrush, many ICU nurses still use foam swabs since they require less dexterity to manipulate than a toothbrush. Using foam swabs and allowing additional build-up of oral debris and dried secretions can lead to deterioration in a patient's oral health and increased incidence of pneumonia.

Thus, despite the importance of providing effective oral hygiene for dependent patients, effective, easy-to-use oral care tools for hospital or institutional environments are lacking. This is a major factor as to why oral care protocols, as discussed above, are often incorrectly implemented or ignored altogether.

Therefore, it would be desirable to provide a toothbrush that minimizes the manual dexterity necessary to clean the teeth and oral cavity of those dependent on others for oral hygiene, for example, an intubated, hospitalized, or other patient or person in residential care, skilled nursing, long term acute care, and rehabilitation facilities. It would also be desirable to provide a toothbrush capable of instillation of rinsing agents and application of suction, so that a single tool may be used to provide effective oral care.

SUMMARY

The present disclosure overcomes the aforementioned drawbacks by providing an electric toothbrush designed to accommodate or compensate for a wide variety of impediments to oral hygiene, such as may be common for people that are hospitalized, people that are living in residential care facilities, people generally dependent on others for oral hygiene, and/or people that are debilitated. The electric toothbrush includes a rotating and/or oscillating low profile head, at least one suction port for vacuum suction, and a user interface.

In some examples, a toothbrush may comprise a head including a body and a tip, the tip including a plurality of bristles; a handle coupled to the body, the handle having a housing; a motor disposed within the housing and operatively coupled to the plurality of bristles; and a suction assembly including: a suction tip disposed adjacent the plurality of bristles of the head, the suction tip having an inlet; and a suction coupler having an outlet configured to be coupled to a suction source, the outlet of the suction coupler being in fluid communication with the inlet of the suction tip; wherein the suction coupler includes an externally accessible ventilation port in fluid communication with the inlet of the suction tip and the outlet of the suction coupler; wherein an entirety of the suction assembly is external to the housing of the handle of the toothbrush.

In some examples, a toothbrush may comprise a head removably attached to a handle at a proximal end and including a plurality of bristles at a distal end; a motor assembly disposed in an interior of the handle and coupled to the plurality of bristles via a shaft extending into the head; and a suction passage extending between a suction inlet and a suction outlet, the suction outlet being configured to couple to a vacuum source; wherein the suction inlet is disposed adjacent the distal end of the head and the suction outlet is disposed adjacent the proximal end of the head, and the suction passage is isolated from fluid communication with the interior of the handle.

In some examples, a toothbrush may comprise a head having a plurality of bristles; a handle detachably coupled to the head; a bristle actuator disposed in an interior of the handle and configured to impart motion to the plurality of bristles; and a suction system including a suction intake port disposed adjacent the plurality of bristles, and a suction coupler configured to selectively couple the suction intake port to a suction source; wherein the suction system is disposed entirely outside of the interior of the handle.

The foregoing and other aspects and advantages of the present disclosure will appear from the following description. In the description, reference is made to the accompanying drawings which form a part hereof, and in which there is shown by way of illustration a preferred embodiment of the present disclosure. Such embodiment does not necessarily represent the full scope of the present disclosure, however, and reference is made therefore to the claims and herein for interpreting the scope of the present disclosure.

DETAILED DESCRIPTION

Generally, the present disclosure provides an electric toothbrush designed to accommodate or compensate for a wide variety of impediments to oral hygiene. The electric toothbrush includes a rotational and/or oscillating low profile head, at least one suction port for vacuum suction, at least one irrigation port for instillation of a rinsing fluid, and a user interface. The handle of the toothbrush provides access to the user interface so that the electric toothbrush can be controlled without undue dexterity or cumbersome interactions.

Figure 1:
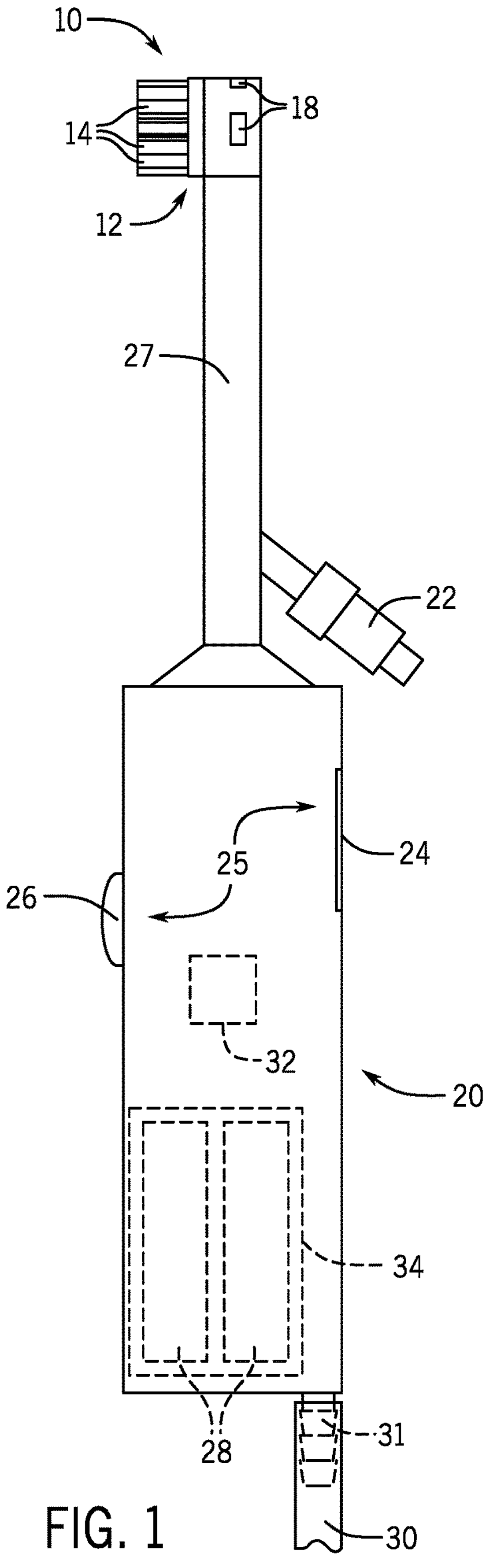
FIG. 1 is a side view of an electric toothbrush in accordance with and/or for use with the present disclosure.
Figure 2:
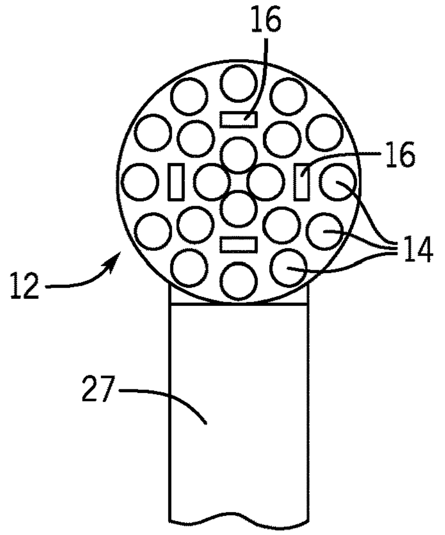
FIG. 2 is a partial front view of the electric toothbrush of FIG. 1.
Figure 3:
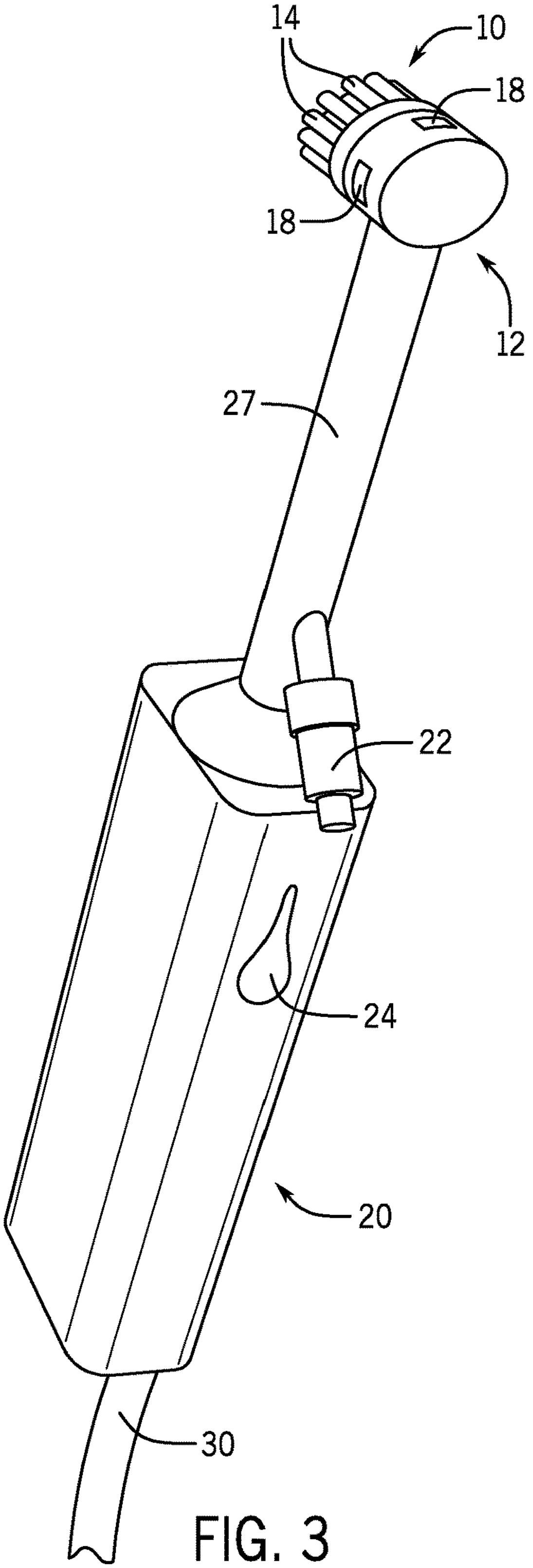
FIG. 3 is a perspective view of the electric toothbrush of FIG. 1.

FIGS. 1-3 illustrate an electric toothbrush 10 according to one implementation of the present disclosure. The electric toothbrush 10 can be used to provide oral care despite any of a wide variety of impediments to oral hygiene, such as may be common for people that have been hospitalized, people living in residential care facilities, people generally dependent on others for oral hygiene, and/or people that have been debilitated. The electric toothbrush 10 can include a head 12 with bristles 14, at least one irrigation port 16, and at least one suction port 18, and a handle 20 with an injection port 22 and a user interface 25 configured to receive feedback from an operator. In some implementations, as shown in FIGS. 1 and 3, the injection port 22 is separate from the handle 20 and is positioned along a post 27 that connects the head 12 and the handle 20. In addition, as shown in FIGS. 1 and 3, the user interface 25 can include a timer button 26 for initiating an internal timer. The handle 20 can also include a ventilation port 24, which may be considered part of the user interface 25. The electric toothbrush 10 can significantly improve oral health by removing dental plaque, oral debris, and oral biofilm, while also stimulating gingival tissues and providing oral moisturizers in patients who are hospitalized, in residential treatment, skilled nursing, long term acute care, and rehabilitation facilities, or otherwise unable to perform oral self-hygiene.

Brushing, irrigation, and suction by the toothbrush 10 can all be provided through the head 12. Providing all three actions on a single tool makes it easier for an operator (for example, a nurse or other care giver that may need to simultaneously attend to multiple tasks and cannot dedicate full attention and all available limbs) to perform oral care on a patient. In this regard, the present disclosure stands in contrast to conventional oral care techniques that include separate suction tubes, rinsing injectors, and toothbrushes. In one implementation of the present disclosure, the head 12 can have a low profile (for example, can be rounded, flatter, with shorter bristles 14, and/or substantially smaller than common manual toothbrush heads). This allows for easier insertion into a patient's mouth, especially for patients who have difficulties opening their mouths due to a restricted range of oral motion or have physical barriers, such as endotracheal tubes, oral gastric tubes, and bite blocks, that hamper access to the patient's oral cavity. In addition, the head 12 and/or the post 27 can be constructed of a pliable material (for example, instead of a hard plastic), which can help reduce damage to the patient's oral cavity during use.

In some implementations, the head 12 (or just the bristles 14) can oscillate, rotate, and/or vibrate during operation. Due to this mechanical action of the head 12, the need for manual dexterity on behalf of the operator is significantly decreased in comparison to using a manual toothbrush. In addition, as shown in FIG. 2, the irrigation ports 16 can be interspersed between the bristles 14 on the front surface of the head 12 to instill an irrigant, or rinsing agent or fluid, into the patient's mouth near the head 12. The suction ports 18 can be located along edges or side surfaces of the head 12 to provide on-demand suction of oral waste (such as the rinsing agent, toothpaste, saliva, and/or other oral debris). Some implementations of the present disclosure may provide the bristles 14, the irrigation ports 16, and the suction ports 18 in relative arrangements other than what is shown in FIGS. 1-3.

Brushing, irrigation, and suction, as described above, can each be separately controlled through the handle 20 without undue dexterity or cumbersome interactions. As such, the operator is further capable of controlling and operating the toothbrush 10 primarily using a single hand, which is not possible with many traditional systems. With respect to irrigation, the injection port 22, located at or near the handle 20, is in fluid communication with the irrigation ports 16 on the head 12 (for example, through internal channels or tubing routed through the post 27). A syringe filled with the rinsing agent (not shown) can be coupled to the injection port 22 so that the operator can expel some or all of the contents of the syringe through the injection port 22, and therefore also through the irrigation ports 16. The injection port 22 and the syringe can be an improvement over other toothbrushes that include liquid reservoirs for rinsing agents because the liquid reservoirs can more easily harbor bacteria within the toothbrush. The injection port 22 and the syringe also allow on-demand use of additional rinsing agent (for example, via additional syringes) while the toothbrush 10 is in use.

With respect to suction, the handle 20 can be coupled to a vacuum/suction device (not shown) by suction tubing 30 attached to a suction connection 31 of the handle 20, as shown in FIG. 1. Internal tubing can be routed from the suction connection 31, through the handle 20, through the post 27, and to the suction ports 18 on the head 12. The ventilation port 24 is, for example, a tear drop-shaped port extending through the handle 20 and into the tubing routed through the handle 20. As shown in FIGS. 1 and 3, the ventilation port 24 can be located along the handle 20 so that an operator's thumb can be used to selectively uncover or cover the ventilation port 24 and therefore selectively provide or stop suction through the suction ports 18, respectively, again, using a single hand. In this regard, the ventilation port 24 can function as a further component in an overall user interface 25 that can be readily accessed and communicated with through the handle 20. In some designs, the ventilation port 24 can be located at other positions along the handle 20 so that an operator's finger (that is, other than the operator's thumb) can be used to selectively uncover or cover the ventilation port 24. For example, in such designs, the ventilation port can be located directly above or below the timer button 26.

As described above, the injection port 22 and the ventilation port 24 provide separate, simple controls for providing suction and irrigation through the handle 20. In other implementations of the present disclosure, the toothbrush 10 can provide constant suction, or can include a different arrangement, such as a switch-actuated or electronic control, to selectively provide or stop suction. Further, the toothbrush 10 can include different arrangements or connectors on the injection port 22 to account for different syringe heads or other types of injection equipment (for example, to accommodate screw-type connections, luer-lock type connections, needleless access connections, etc.).

With respect to brushing, mechanical operation of the bristles 14 can be controlled through the handle 20. For example, the handle 20 can include an on/off switch (not shown) as part of the user interface 25 so that an operator can turn on and shut off mechanical operation of the bristles 14, again, by interacting with the single handle 20, such as can be achieved using a single hand. The on/off switch can be connected to an internal controller 32 located within the handle 20. The internal controller 32 can be electrically coupled to the head 12 (for example, via electrical connections routed through the post 27) to actuate mechanical operation of the head 12.

Alternatively, or in addition to the on/off switch, the handle 20 can include the timer button 26, as shown in FIG. 1, connected to the internal controller 32. The internal controller 32 can include an internal timer and activates mechanical operation of the bristles 14 for a preset time period when the timer button 26 is pressed. More specifically, pressing the timer button 26 causes the controller 32 to actuate mechanical operation of the head 12 and/or the bristles 14 (that is, rotation, oscillation, and/or vibration) for two minutes, in accordance with current outpatient oral care standards, or another set time. In other words, the controller 32 is configured to start the internal timer in response to predetermined feedback from the operator (that is, pressing the timer button 26), and the internal timer is configured to expire when the preset time period, such as two minutes, has passed. The controller 32 is configured to actuate mechanical operation of the head 12 when the internal timer is started and to stop actuation when the internal timer is expired. This can provide a standardized time that the operator should brush the patient's teeth, thus helping implement standardized protocols.

Also, the timer, the controller 32, and/or the mechanical parts for rotating and/or oscillating the bristles 14 can be powered by batteries 28 located inside the handle 20, for example, in a user-accessible battery compartment 34. The batteries 28 can be replaceable, in which case the handle 20 can include a removable cover (not shown) for insertion and removal of the batteries 28 within the battery compartment 34. In some implementations, the batteries 28 can be rechargeable, in which case the handle 20 can include charging leads and can be plugged into a charging dock, or can include a charging port for receiving a charging plug.

Figure 4:
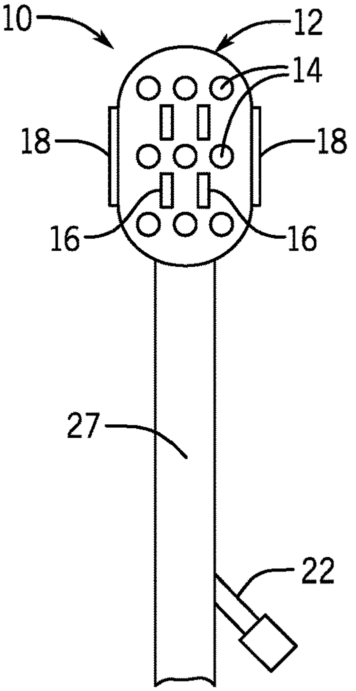
FIG. 4 is a partial front view of an electric toothbrush with at least a portion of a handle transparent in accordance with and/or for use with the present disclosure.
Figure 5:
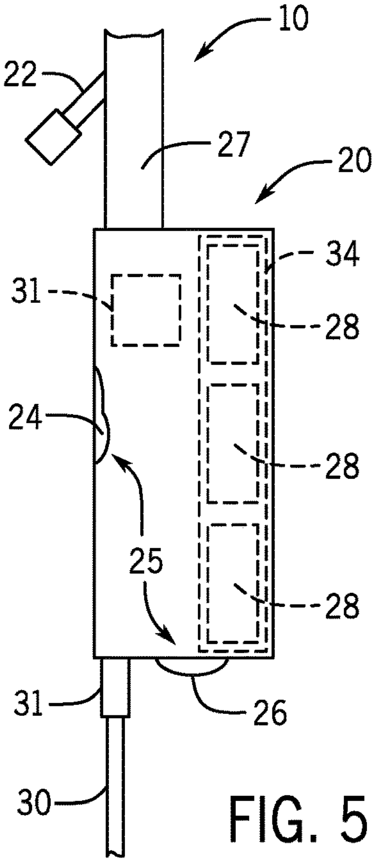
FIG. 5 is a partial side view of the electric toothbrush of FIG. 4.

As described above, the head 12 can have a substantially low profile and can be substantially tapered from the handle 20. The low profile and tapered design can allow for easier use by an operator to provide oral care to a subject or patient. In one example, the low profile can allow for an operator to better provide oral care to an intubated patient. FIGS. 1-3 illustrate the head 12 with a round profile. FIGS. 4-5 illustrate an electric toothbrush according to another implementation of the present disclosure. The electric toothbrush 10 of FIGS. 4-5 can include similar components as the electric toothbrush of FIGS. 1-3, but with a more oval or rectangular profile head 12. In some implementations, mechanical brushing operations can include circular or lateral oscillation of the bristles 14 (that is, with either the round profile of FIG. 2 or the rectangular profile of FIG. 4). In addition, the electric toothbrush 10 of FIGS. 4-5 includes a different shaped battery storage compartment 34 and different user interface 25 placement.

One or more of the components described above can be disposable for single-time or multiple-time use. For example, in one implementation of the present disclosure, the head 12 and the handle 20 can be removably coupled together, having relative connecting portions, so that the head 12 can be detached from the handle 20 and disposed of after use and a new, clean head 12 can be connected to the handle 20 during the next use. In some implementations, the head 12 and the post 27 can be one integral piece (that is, the post 27 can be part of the head 12) and the post 27 can be removably coupled to the handle 20 to allow detachment and replacement of the head 12 after one or more uses. The suction tubing 30 can also be detachable from the handle 20, as shown in FIG. 1, so that the electric toothbrush 10 can be used with different suction devices (for example, so that the operator only needs to transport the electric toothbrush 10, rather than both the electric toothbrush 10 and the vacuum/suction device).

Furthermore, other components can be attached to the handle 20 and/or the head 12 for additional oral care, such as a replaceable tongue scraper attachment (not shown). In some designs, a rear surface of the head 12 (that is, relative to the front surface including the bristles 14 and the irrigation ports 24 and the side surface including the suction ports 18, as shown in FIGS. 1-5) can include a tongue scraper portion. In addition, some implementations of the present disclosure can include different combinations of the components described above. For example, the electric toothbrush 10 can be a suction-only toothbrush, including only the suction ports 18 rather than both the suction ports 18 and the irrigation ports 16, for use with patients requiring only suction assistance during oral care.

According to some implementations of the present disclosure, a toothbrush is provided that brushing, irrigation, and suction capabilities. The toothbrush can include a rotational and/or oscillating low profile head, at least one suction port, at least one irrigation port, and a user interface. More specifically, the toothbrush can include a handle with an irrigation compartment configured to receive a syringe. The irrigation compartment is in fluid communication with the at least one irrigation port for providing a rinsing fluid supplied via the syringe. The toothbrush can further include a suction assembly at least partially detachable from and/or adjustable relative to a head or handle of the toothbrush. The suction assembly can include the at least one suction port and can enable selective suction via one-handed operation of the toothbrush. The handle of the toothbrush also provides access to the user interface to enable selective rotation, oscillation, or vibration of bristles on the head so that the electric toothbrush can be controlled without undue dexterity or cumbersome interactions, and includes a light source directing light toward the head to enable viewing of a patient's mouth during operation.

Figure 22:
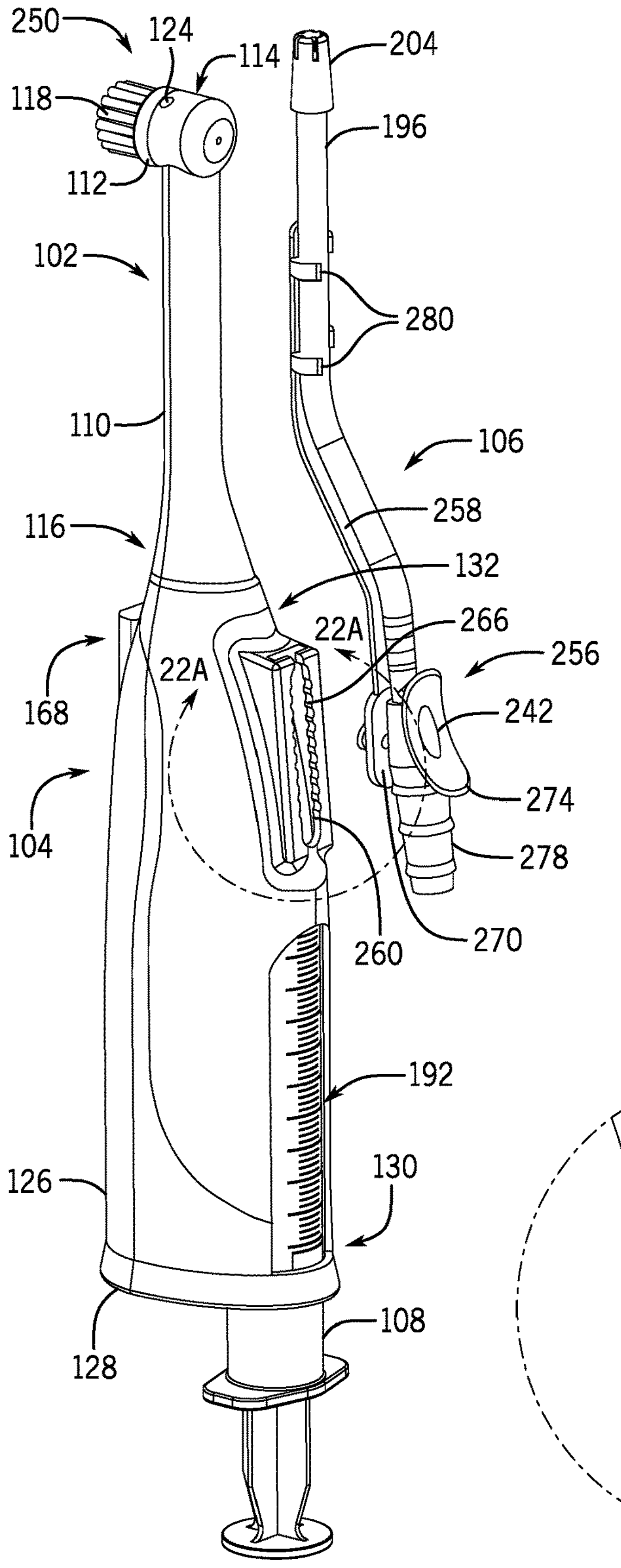
FIG. 22 is a rear perspective view of the electric toothbrush of FIG. 18.
Figure 23B:
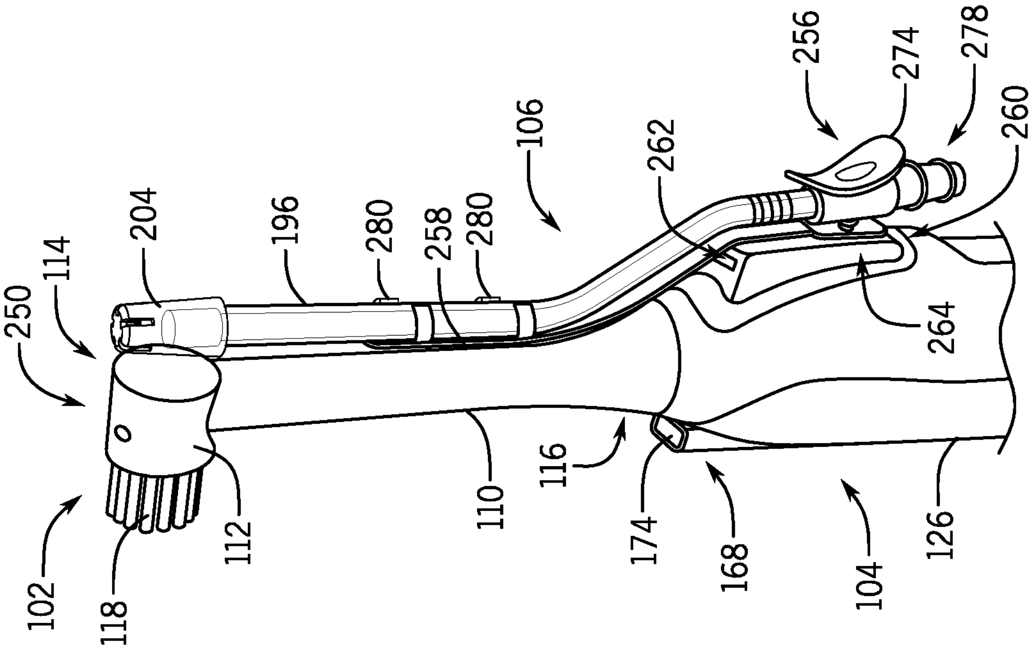
FIG. 23B is a rear perspective view of the electric toothbrush of FIG. 18 configured in a suction non-use position.
Figure 23A:
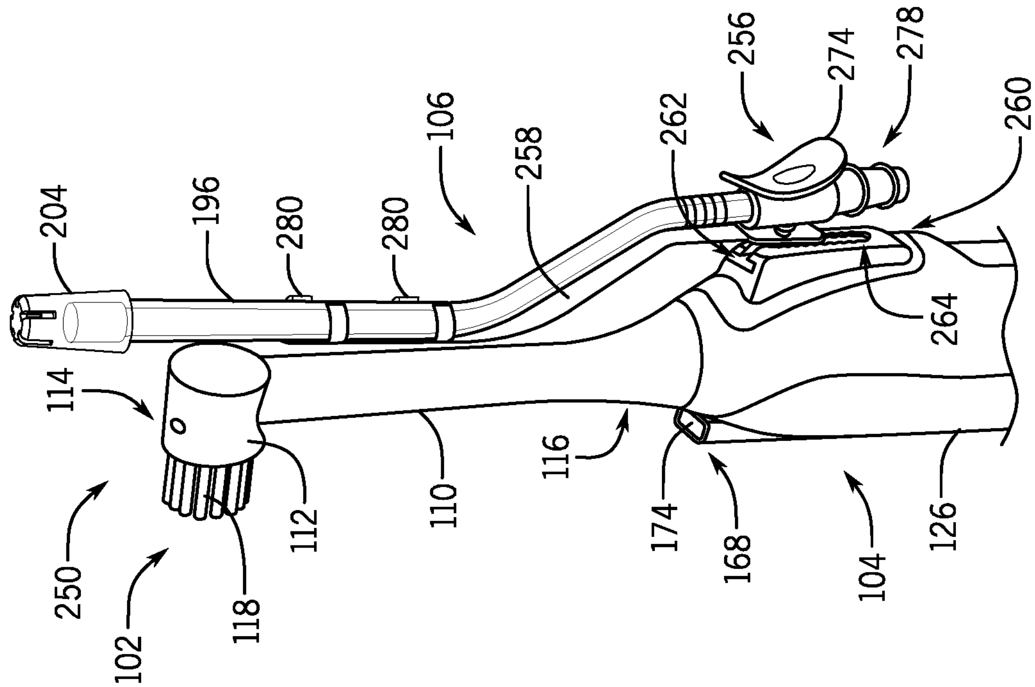
FIG. 23A is a rear perspective view of the electric toothbrush of FIG. 18 configured in a suction use position.
Figure 25:
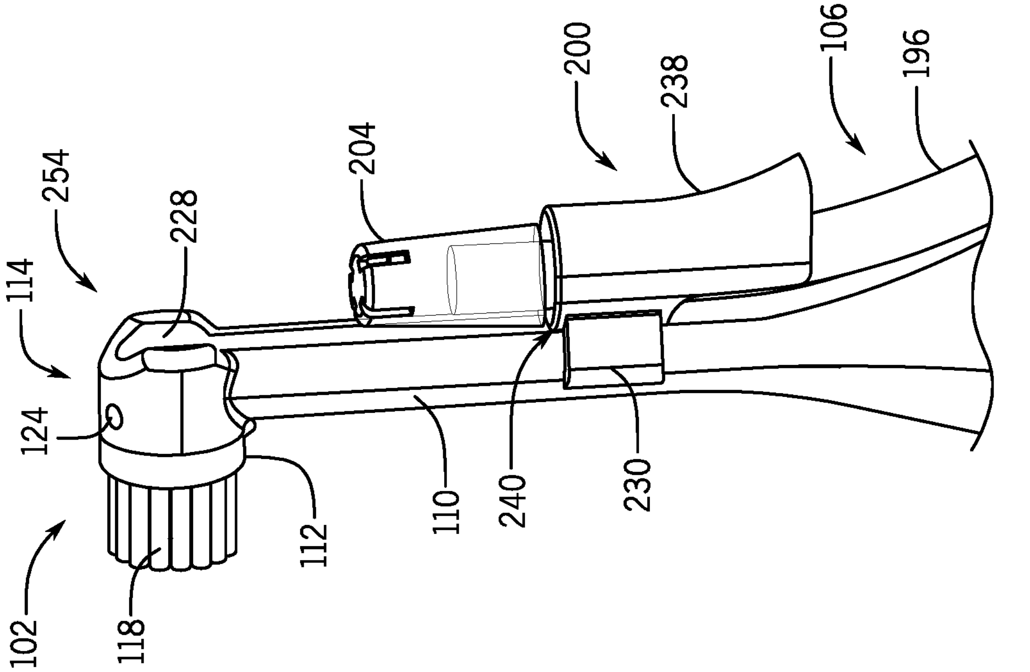
FIG. 25 is a partial side view of an electric toothbrush with a suction tip transparent in accordance with and/or for use with the present disclosure.
Figure 24:
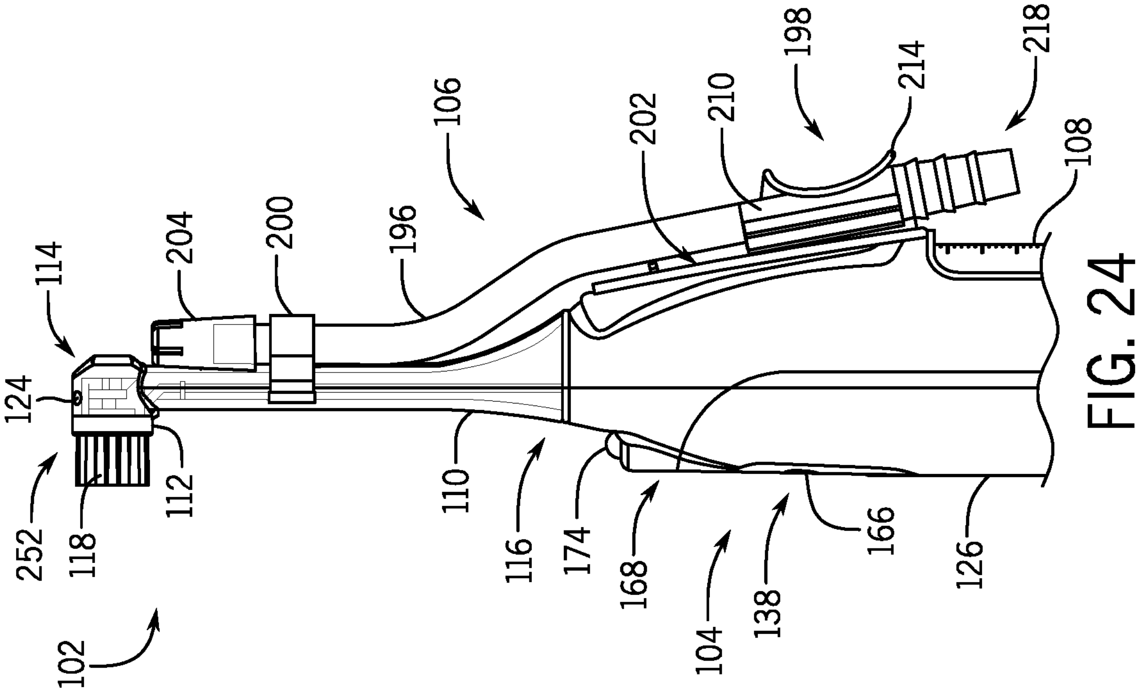
FIG. 24 is a partial rear perspective view of an electric toothbrush with a suction tip transparent in accordance with and/or for use with the present disclosure.

For example, FIGS. 6-17 illustrate an electric toothbrush 100, according to one implementation of the present disclosure. FIGS. 18-23B illustrate a toothbrush 250, according to another implementation, and FIGS. 24 and 25 illustrate a toothbrush 252, 254, respectively, according to other implementations. Additionally, FIGS. 26-29 illustrate a toothbrush 255 according to another implementation, and FIGS. 30-34 illustrate a toothbrush 257 according to yet another implementation. Generally, these implementations may share one or more similar functions and/or structures (as indicated by like reference numerals). Accordingly, while the following disclosure may generally reference toothbrush 100, the described functions and structures may be applied to any other implementation (i.e., toothbrushes 250, 252, 254, 255, 257), unless otherwise stated, and may therefore reference one or more figures of such implementations.

Figure 26:
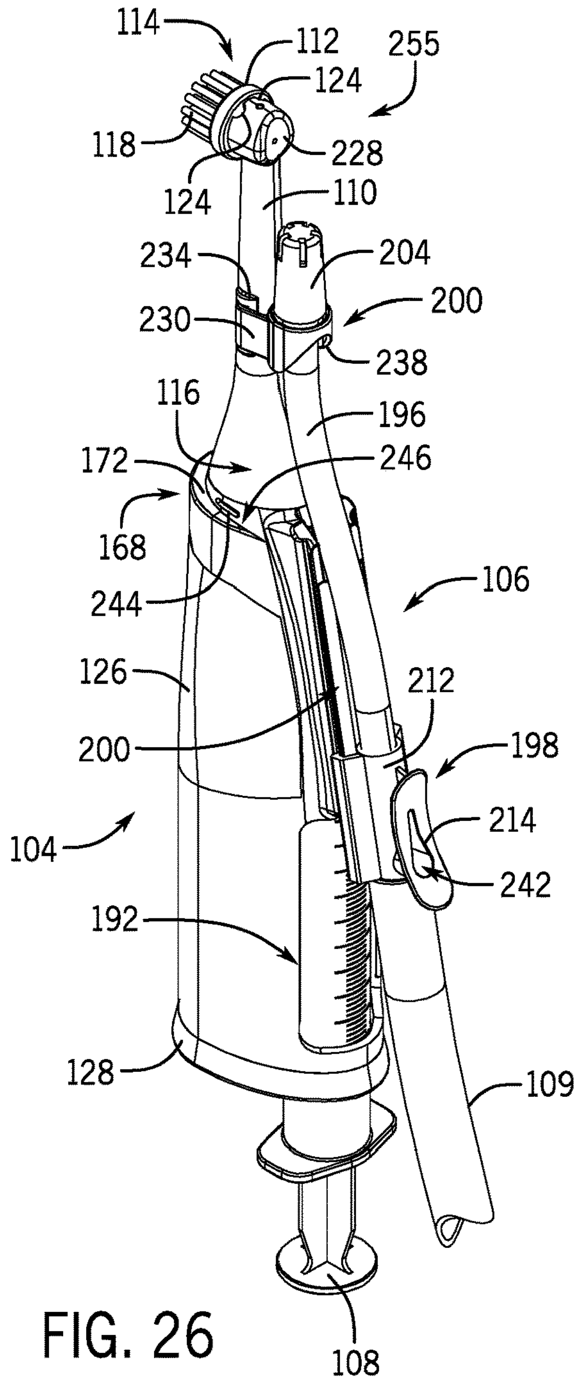
FIG. 26 is a rear perspective view of an electric toothbrush in accordance with and/or for use with the present disclosure.
Figure 27:
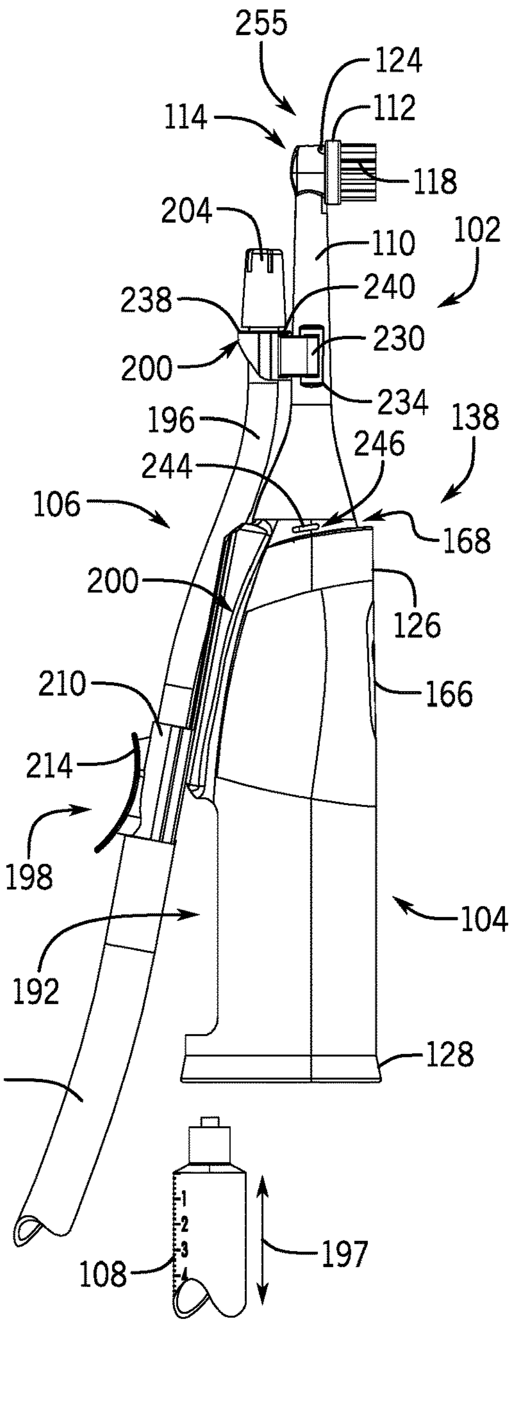
FIG. 27 is a side view of the electric toothbrush of FIG. 26.

Generally, as shown in FIGS. 6-17, the toothbrush 100 can include a head 102, a handle 104, and a suction assembly 106. The head 102 can be coupled to the handle 104 in a permanent or removable manner, and the suction assembly 106 can be coupled to the handle 104 and/or the head 102. Using an attached syringe 108 and suction tubing 109 (e.g., as shown in FIGS. 26 and 27), the toothbrush 100 can be operated by an operator, primarily using a single hand, to achieve brushing, suction, and/or irrigation.

Figure 29:
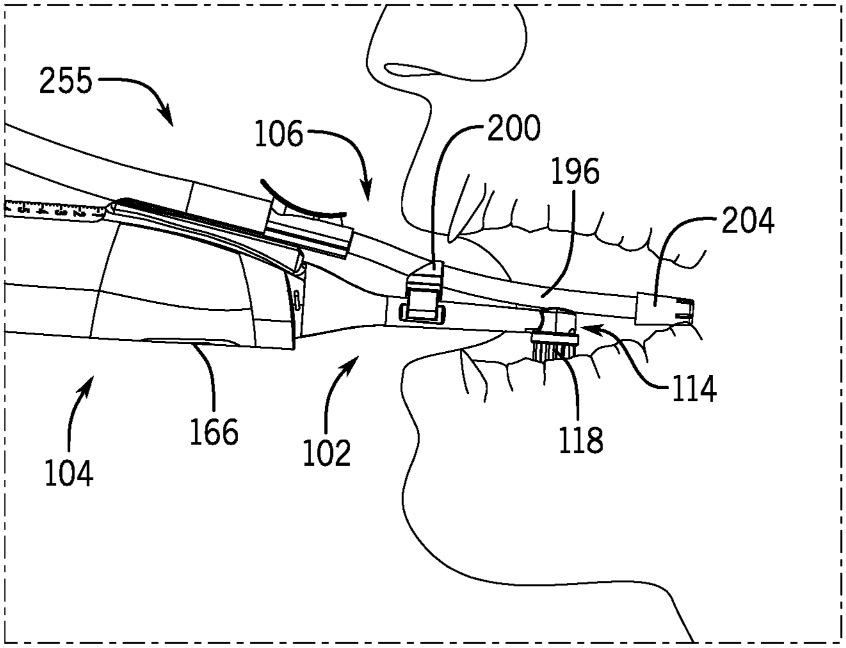
FIG. 29 is a side view of the electric toothbrush of FIG. 26 inside a patient's oral cavity and in a suction use position.
Figure 30:
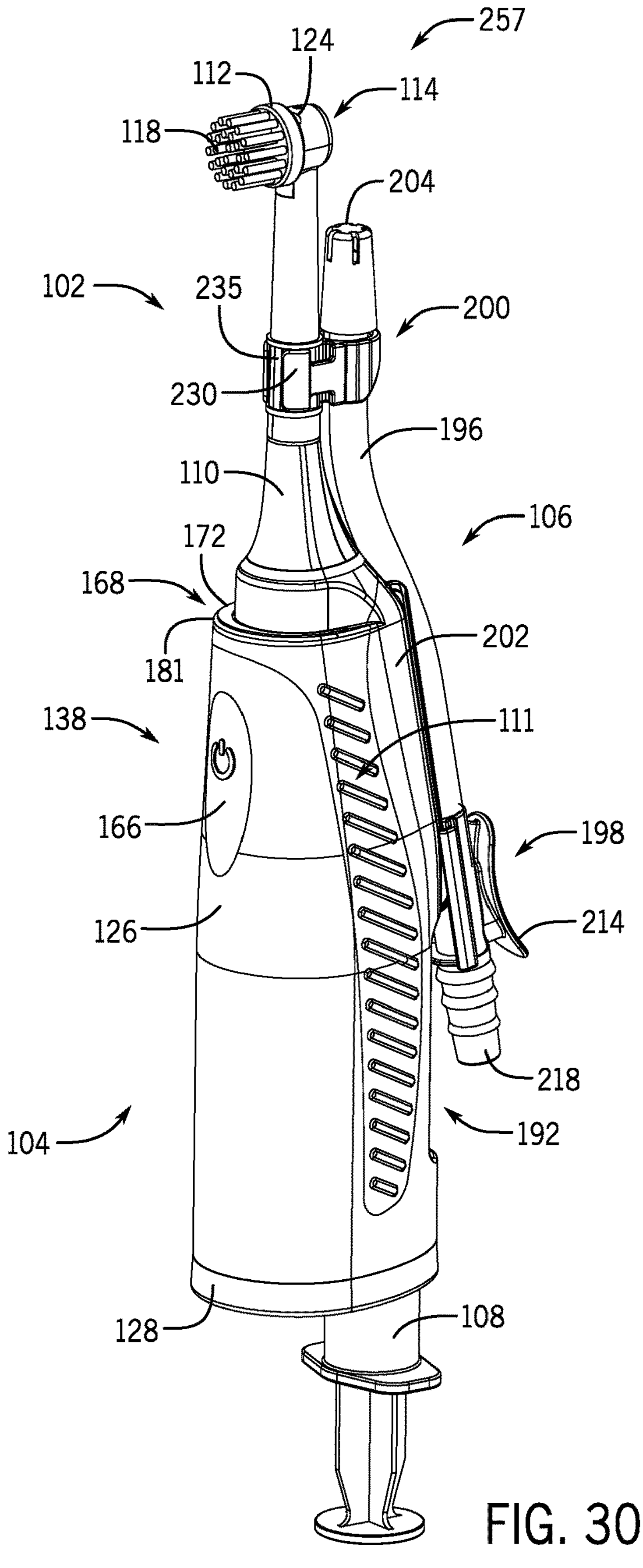
FIG. 30 is a front perspective view of an electric toothbrush in accordance with and/or for use with the present disclosure.
Figure 31:
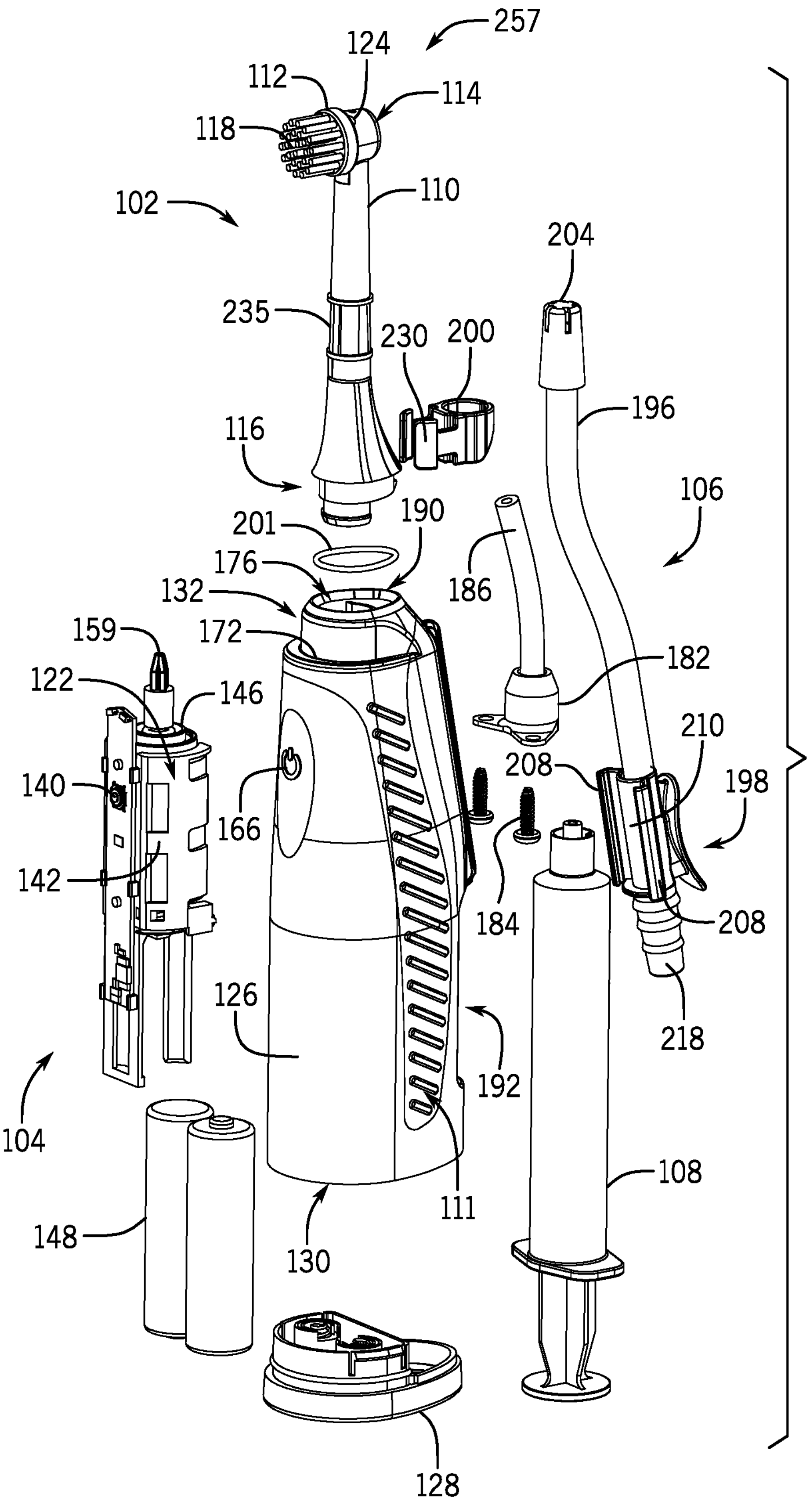
FIG. 31 is an exploded parts view of the electric toothbrush of FIG. 30.

In some implementations, the head 102 is separate from the handle 104 to permit easier assembly and manufacturing of the toothbrush 100. For example, the head 102 and the handle 104 can be made of plastic and separately molded, then coupled together via an elastic overmold. In another example, the head 102 and the handle 104 are formed integrally. In yet another example, the head 102 can be removably coupled to the handle 104 (as further described below with reference to FIGS. 26-34), for example, to permit use of the handle 104 with interchangeable heads 102 or single-use, disposable heads 102. Additionally, in some implementations, as shown in FIGS. 30-31, the handle 104 can include overmolded grip areas for more secure handling of the toothbrush 257.

Figure 9:
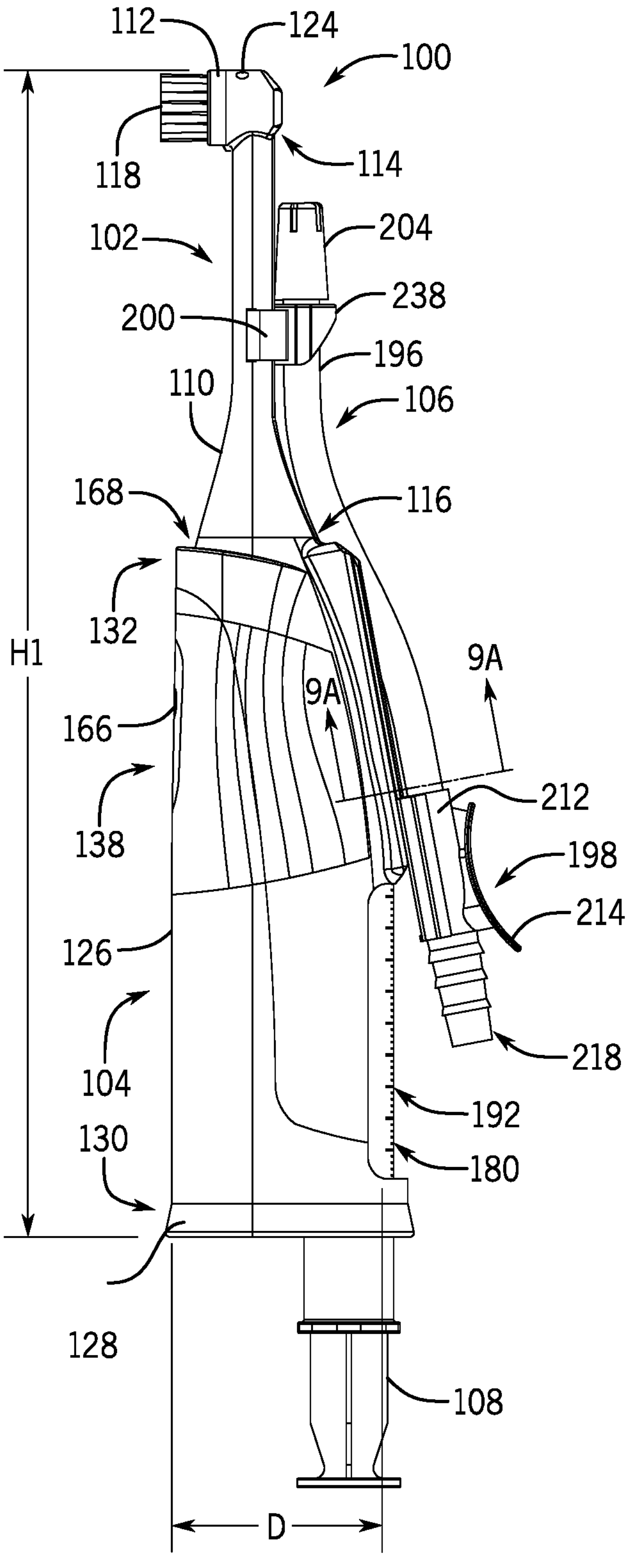
FIG. 9 is a side view of the electric toothbrush of FIG. 6.
Figure 9A:
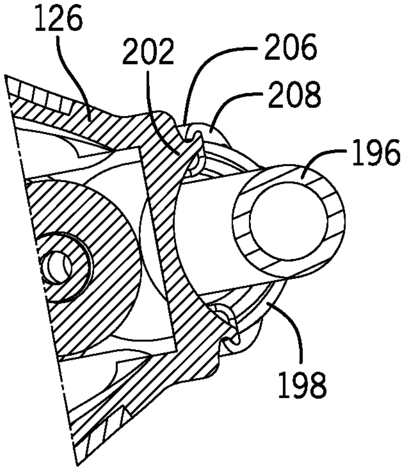
FIG. 9A is a top cross-sectional view of the electric toothbrush of FIG. 6, taken along line A-A of FIG. 9.
Figure 10:
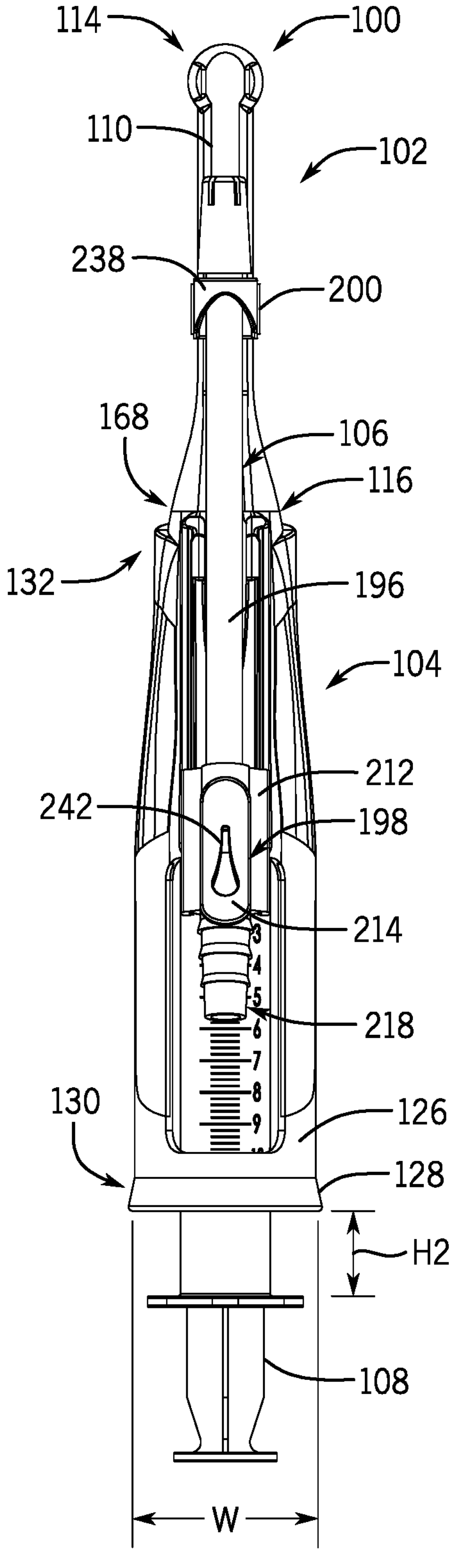
FIG. 10 is a rear view of the electric toothbrush of FIG. 6.
Figure 11:
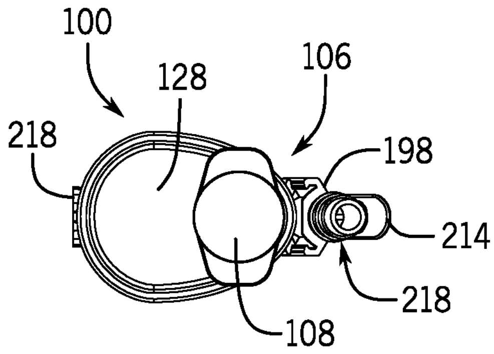
FIG. 11 is an underside view of the electric toothbrush of FIG. 6.

Additionally, when assembled, the toothbrush 100 can have a smaller profile than other manual brushes. The smaller profile can permit easier maneuverability for an operator to use the toothbrush 100 on a patient, especially for patients who have difficulties opening their mouths due to a restricted range of oral motion or have physical barriers that hamper access to the patient's oral cavity. In one example, as shown in FIG. 10, the toothbrush can have a height H1 of about 8.27 inches and a depth D of about 1.49 inches, as shown in FIG. 9, and width W of about 1.32 inches. Also, similar to the head 12 of FIGS. 1-3, the head 102 can have a low profile (that is rounded, flatter, with shorter bristles 118, and/or substantially smaller than common manual toothbrush heads) to permit easier insertion into a patient's mouth. At least a portion of the head 102 (such as a post 110, described below) can be constructed of a pliable material, which can help reduce damage to a patient's oral cavity during use.

Figure 6:
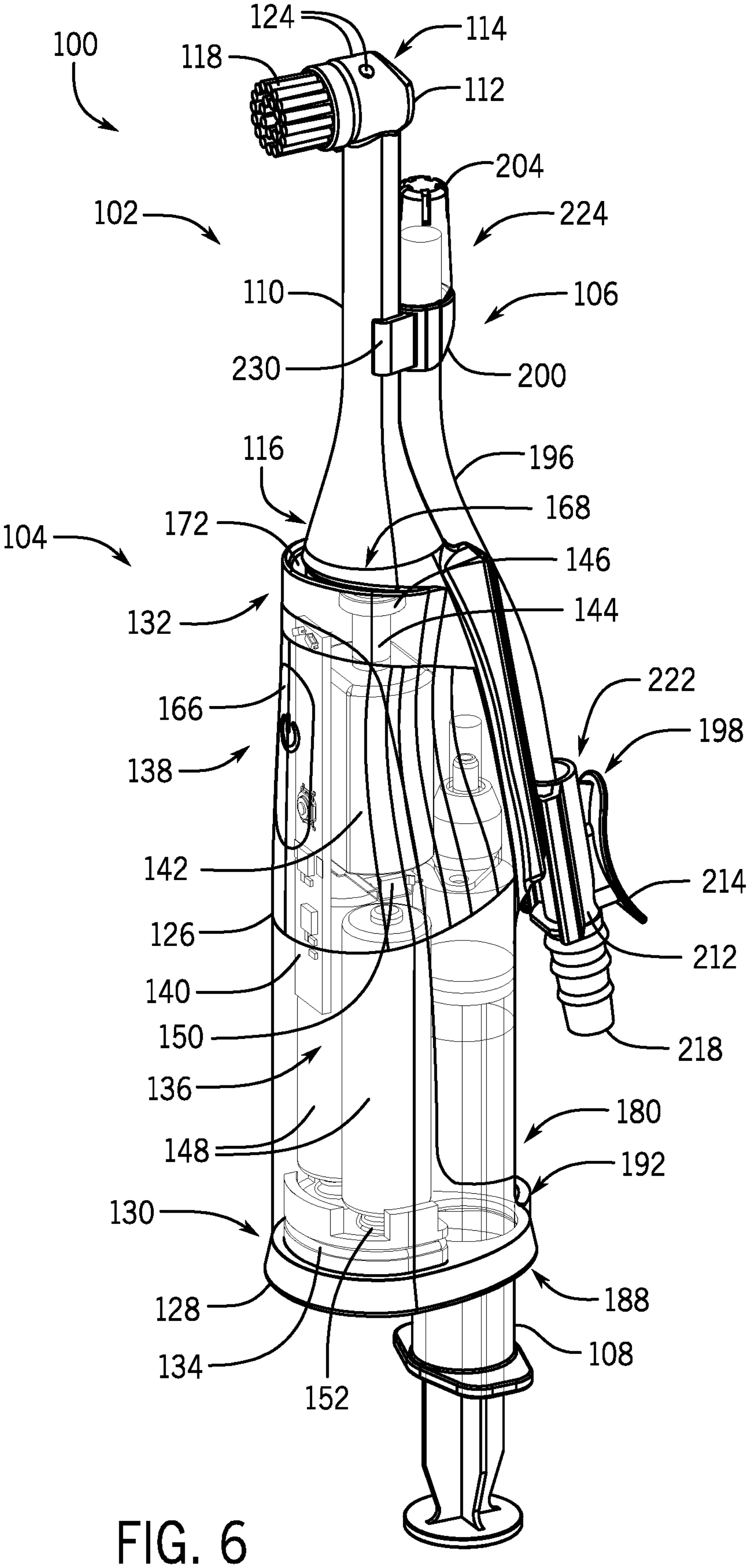
FIG. 6 is a perspective view of an electric toothbrush in accordance with and/or for use with the present disclosure.
Figure 7:
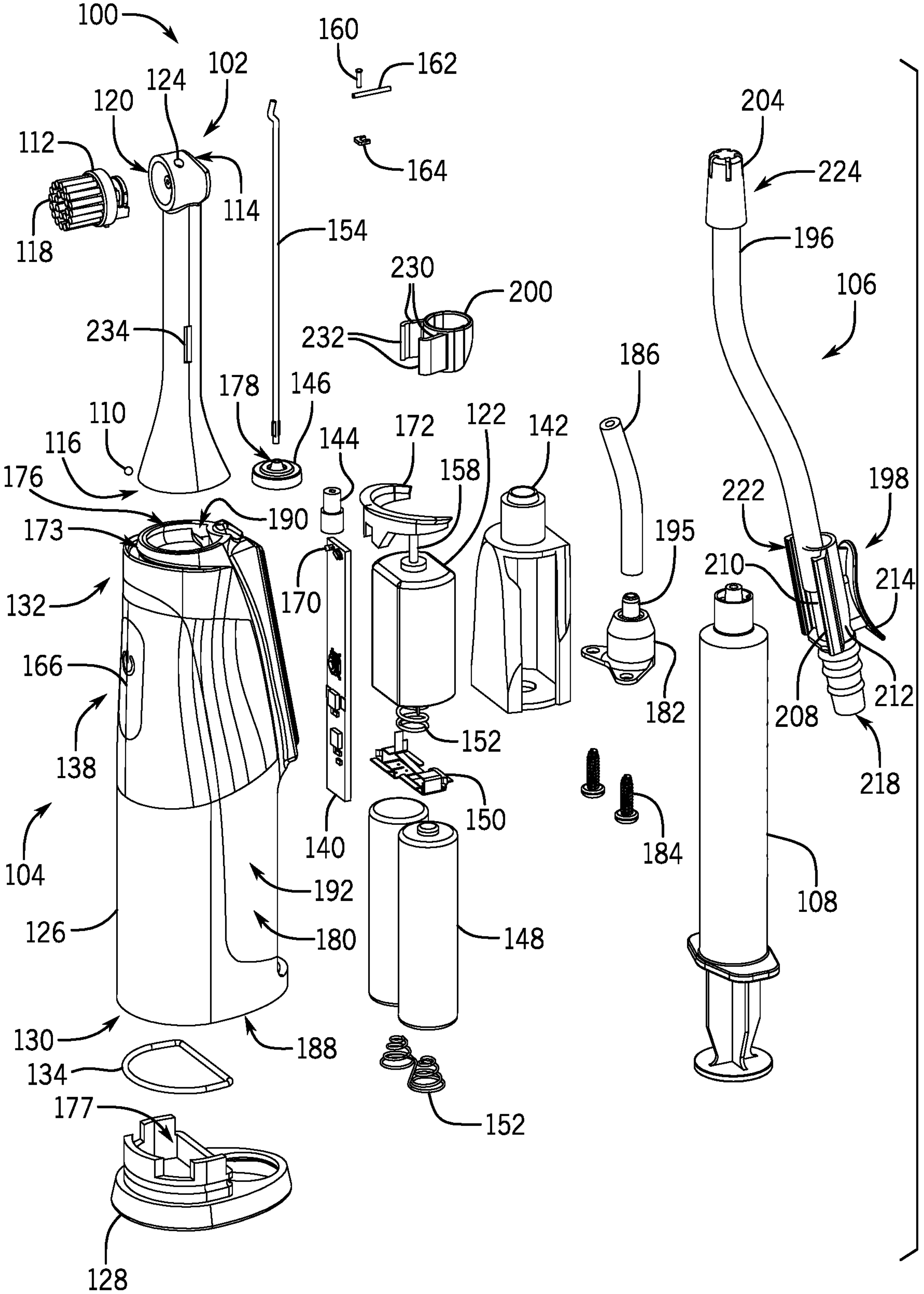
FIG. 7 is an exploded parts view of the electric toothbrush of FIG. 6.
Figure 33:
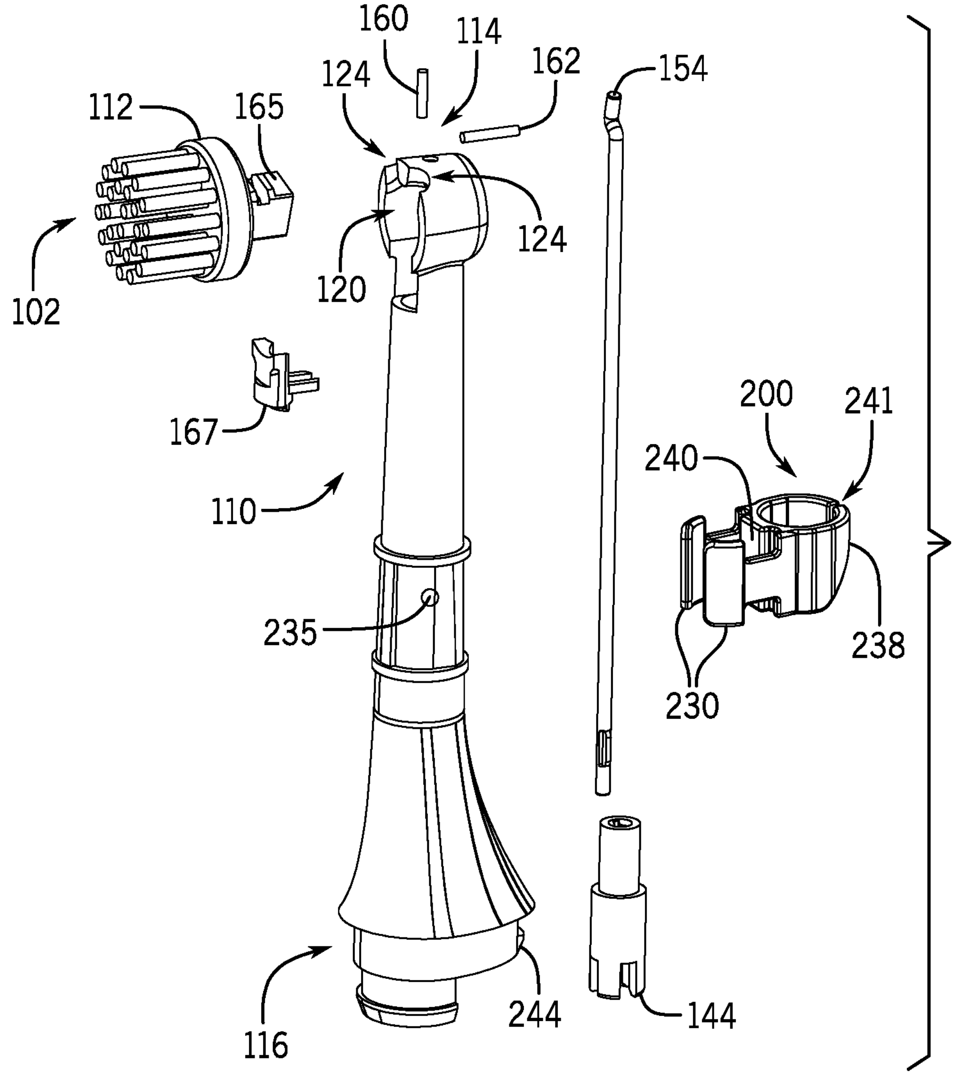
FIG. 33 is a partial exploded parts view of a head of the electric toothbrush of FIG. 30.

As shown in FIGS. 6-10, the head 102 can include the post 110 and a tip 112 coupled to or integral with an end 114 of the post 110 (while an opposite end 116 of the post 110 is coupled to the handle 104). More specifically, as shown in FIGS. 7 and 33, the tip 112, which can include bristles 118, can be coupled to the post 110 at an opening 120 of the post 110. As shown in FIGS. 7 and 33, the tip 112 can be coupled at the opening 120 so that the bristles 118 extend outward away from the tip 112 in a substantially perpendicular manner relative to the post 110. In other implementations, however, the bristles 118 may extend at different angles relative to the post 110. The bristles 118 can be rotated, oscillated, or vibrated by a motor 122 located in the handle 104, as further described below. Moreover, in some implementations, some or all of the bristles 118 may comprise a substantially uniform length; however, in other implementations, some or all of the bristles 118 may comprise non-uniform lengths, which may provide for an uneven brushing surface to enable at least a portion of the bristles 118 to reach difficult to access areas of tooth surfaces.

Figure 28:
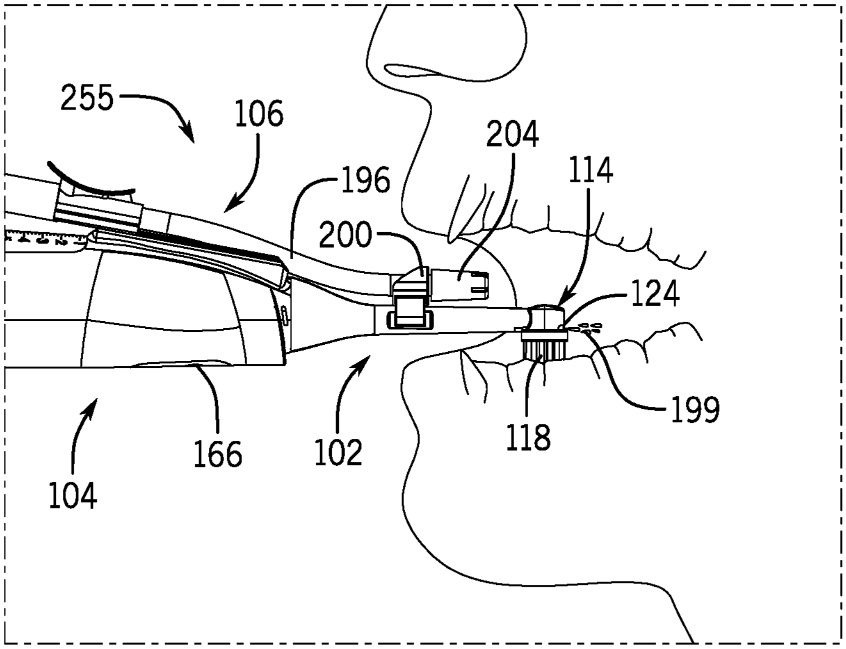
FIG. 28 is a side view of the electric toothbrush of FIG. 26 inside a patient's oral cavity and in a suction non-use position.

Furthermore, the end 114 of the post 110 and/or the tip 112 can include one or more irrigation ports 124. The irrigation ports 124 can permit a fluid inside the post 110 to exit, through the irrigation ports 124, to the ambient environment outside the head 102 (such as into a patient's mouth during use of the toothbrush 255, as shown in FIG. 28). Fluid can reach the post 110 via the syringe 108 threaded into to the handle 104, as further described below. As shown in FIGS. 6, 7, 9, 13A-16, 18-19, 21-22, and 24-33, the irrigation ports 124 can be openings located at or near the top end 114 of the post 110 and/or circumscribing the opening 120. Alternatively, the irrigation ports 124 can be openings dispersed between the bristles 118 on the tip 112, similar to the toothbrush 10 of FIGS. 1-5.

Illustratively, the toothbrush 100 includes two irrigation ports 124. However, any number of irrigation ports 124 may be contemplated in various implementations of the present disclosure, such as one, two, three, four, or more irrigation ports 124. Additionally, in some implementations, such as the toothbrushes 100, 250, 252, 254 of FIGS. 6-25, the irrigation ports 124 may be defined as through-holes through the post 110. In other implementations, such as the toothbrushes 255, 257 of FIGS. 26-34, the irrigation ports 124 may be defined by the post 110 and the tip 112 (e.g., at an intersection where the post 110 and the tip 112 meet).

Referring now to FIGS. 6, 7, and 31 the handle 104 can include a housing 126 and an end cap 128 coupled to an end 130 of the housing 126 (while an opposite end 132 of the housing 126 is coupled to the head 102). The end cap 128 can be coupled to the housing 126 by, for example, a pressure fit. However, other coupling mechanisms may be used in other implementations. Also, a seal or gasket 134, as shown in FIGS. 6 and 7, can be positioned between the end cap 128 and the housing 126 to create a sealed compartment 136 within the housing 126 when the end cap 128 is coupled to the housing 126, as further described below.

Generally, the housing 126 can house components for tip operation and irrigation. More specifically, regarding tip operation, the housing 126 can include a user interface 138, a printed circuit board (PCB) assembly 140, a motor 122, a motor chassis 142, a coupler 144, a seal 146, and one or more batteries 148, battery contacts 150, and battery springs 152, as shown in FIGS. 7 and 31. The motor 122 can be housed within the motor chassis 142 and controlled by the PCB assembly 140, which may act as an internal controller of the toothbrush 100. More specifically, the motor 122 can be controlled by the PCB assembly 140 to actuate at least one of rotation, oscillation, and vibration of the bristles 118 in response to feedback form the user interface 138.

Figure 8:
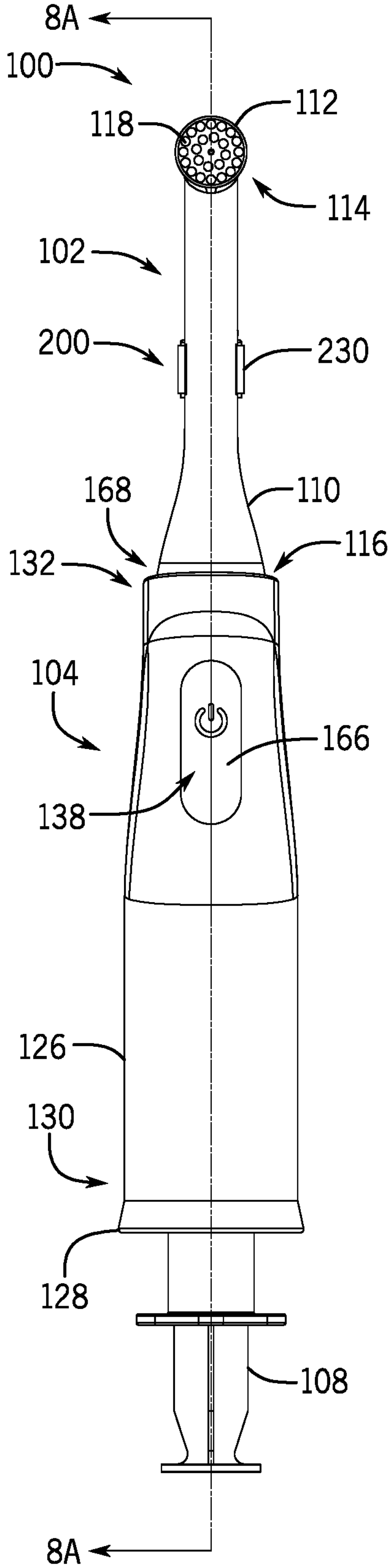
FIG. 8 is a front view of the electric toothbrush of FIG. 6.
Figure 8A:
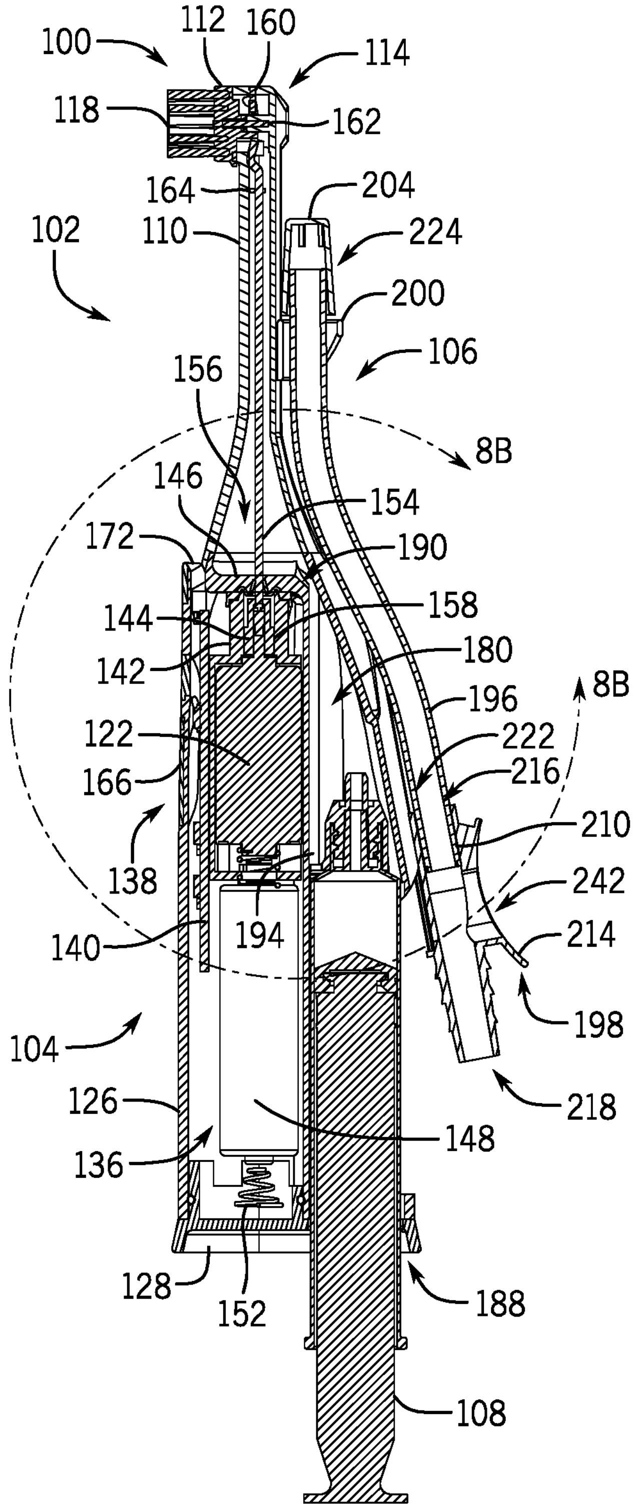
FIG. 8A is a side cross-sectional view of the electric toothbrush of FIG. 6, taken along line A-A of FIG. 8.
Figure 8B:
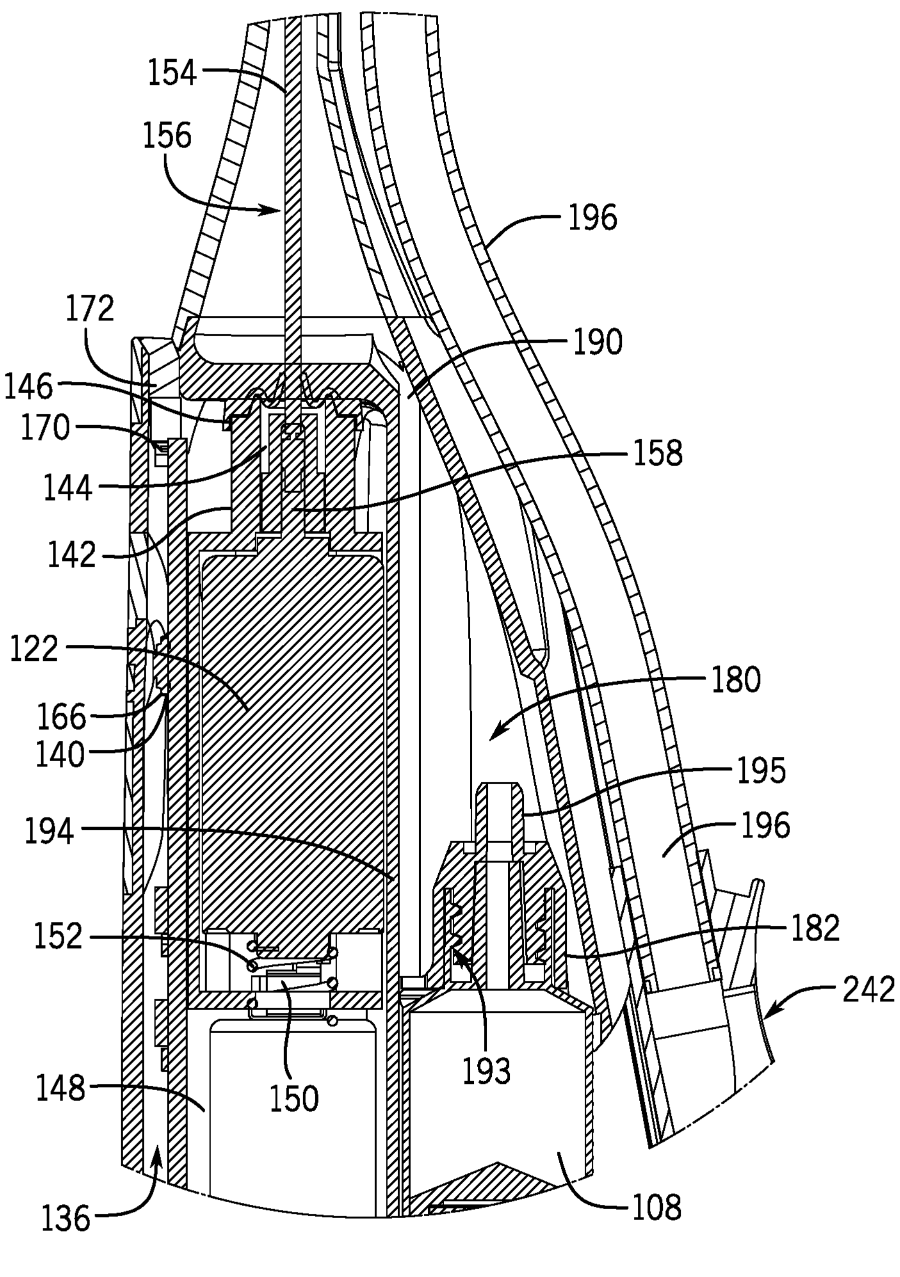
FIG. 8B is a partial side cross-sectional view of the electric toothbrush of FIG. 6, taken from FIG. 8A.

In particular, the motor 122 can be controlled to operate a camshaft 154 located in the head 102 (that is, within an internal compartment 156 of the head 102) and in communication with the tip 112. For example, as shown in FIGS. 8A, 19, 20, and 32, the toothbrush 100 includes the camshaft 154 positioned within the internal compartment 156. The camshaft 154 can be operatively coupled to a shaft 158 of the motor 122 via the coupler 144, as shown in FIGS. 8A-8B and 20, so that rotation of the motor shaft 158 by the motor 122 rotates the camshaft 154. In some implementations, as shown in in FIG. 32, the toothbrush 257 can include an additional motor coupler 159 configured to be coupled between the motor shaft 158 and the coupler 144.

Figure 19:
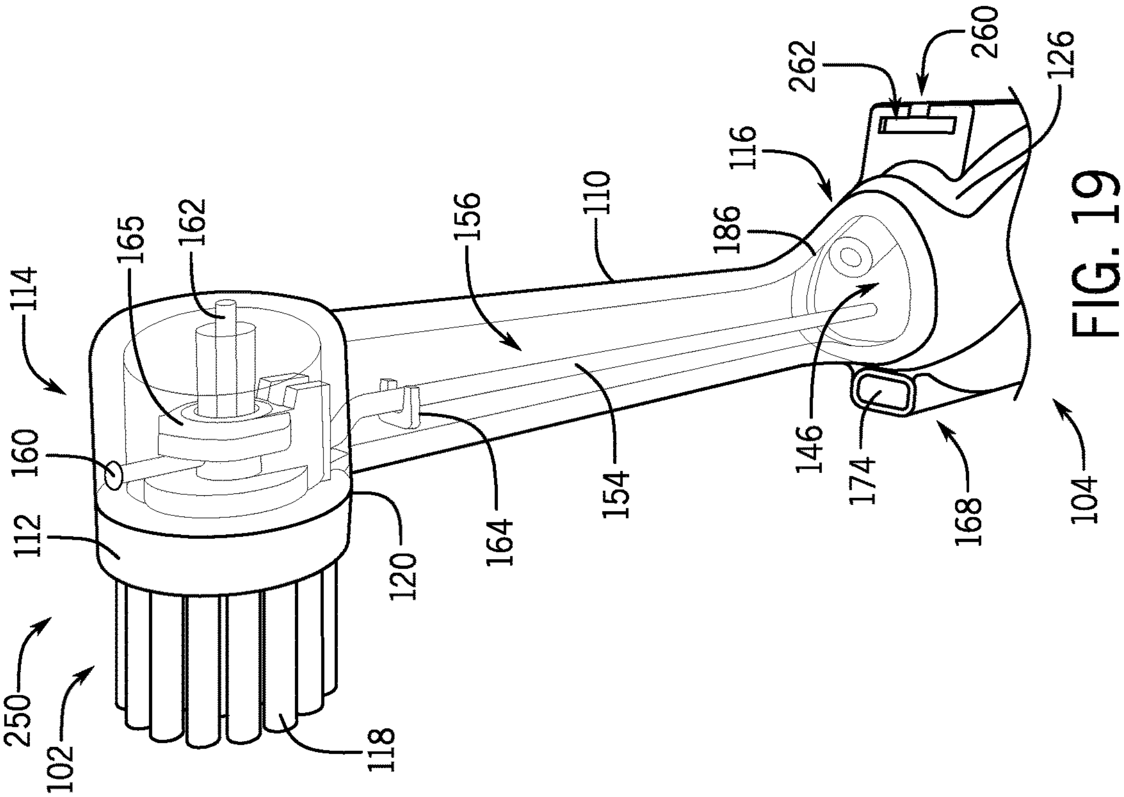
FIG. 19 is a rear perspective, internal view of the electric toothbrush of FIG. 18 illustrating components positioned inside a post of the toothbrush (i.e., the post is transparent).
Figure 18:
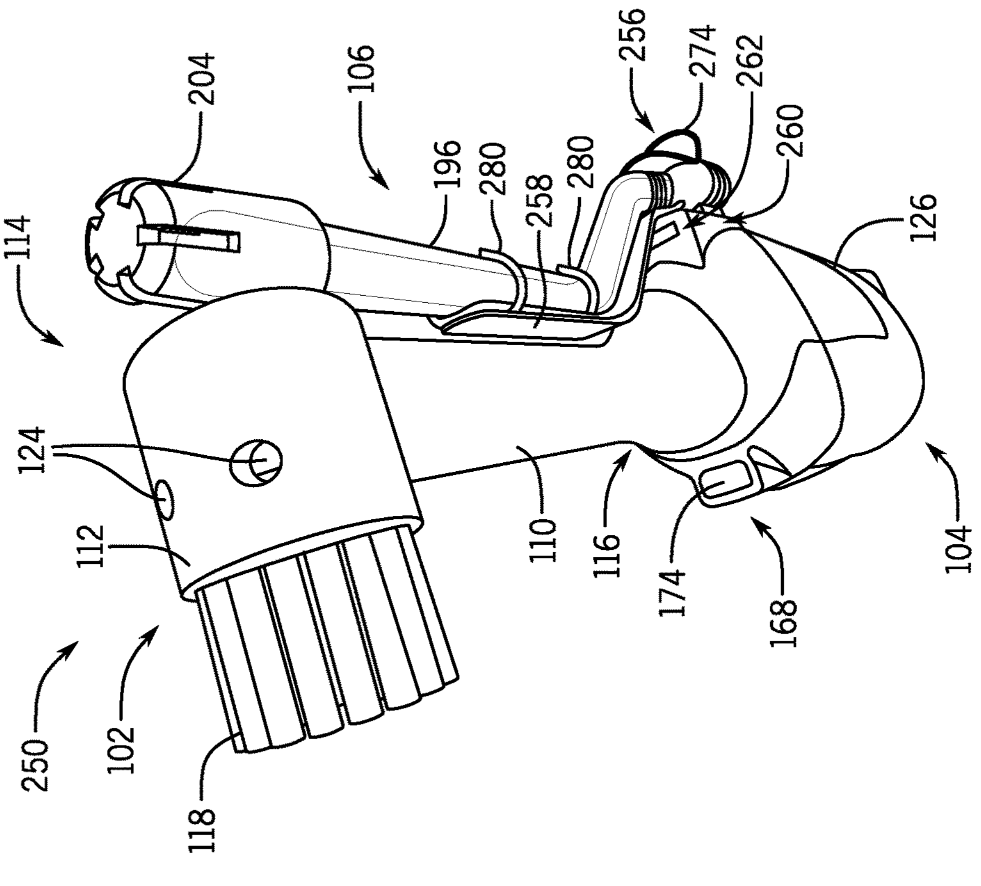
FIG. 18 is a top perspective view of an electric toothbrush in accordance with and/or for use with the present disclosure.
Figure 20:
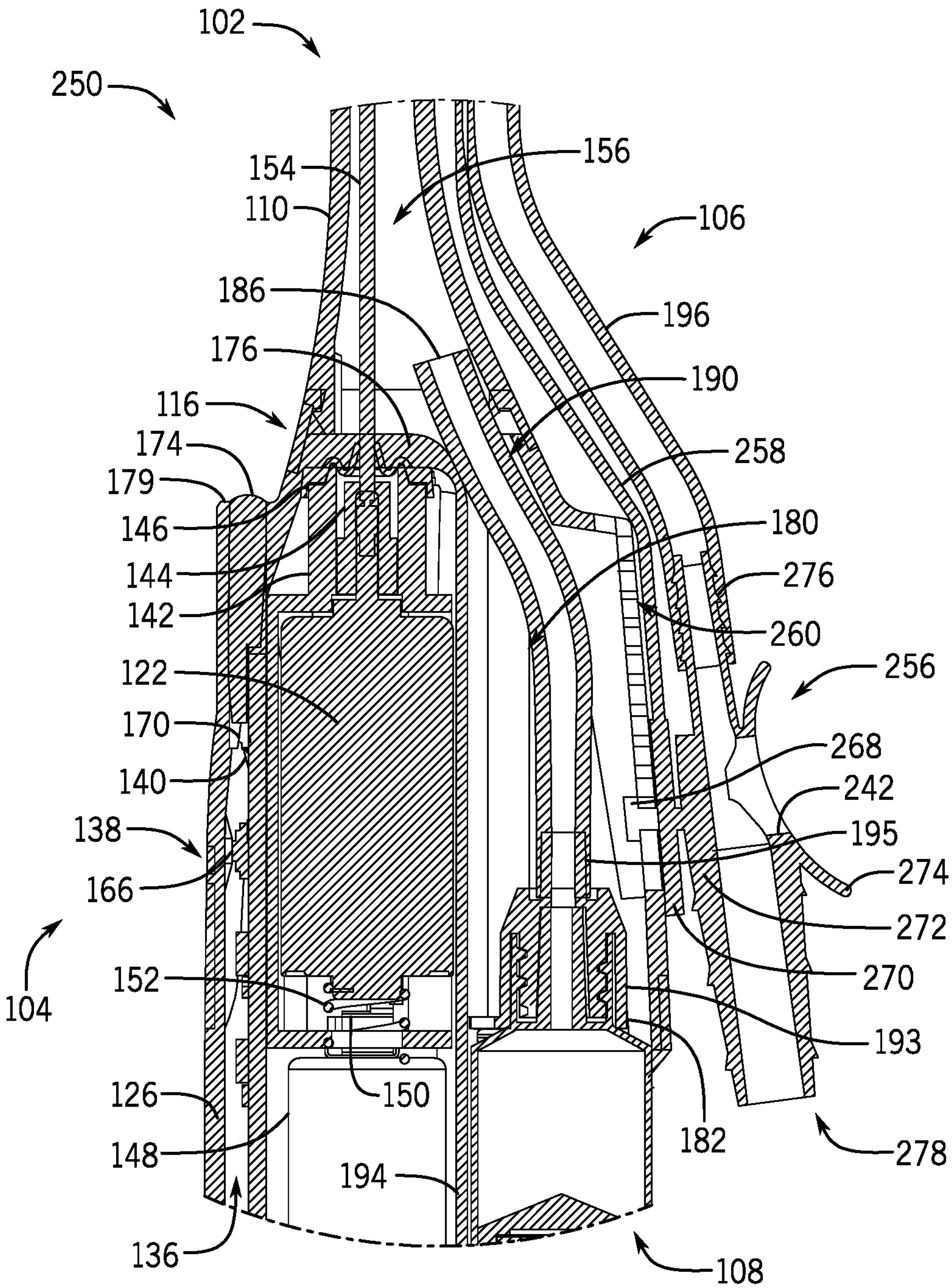
FIG. 20 is a partial side cross-sectional view of the electric toothbrush of FIG. 18.

The camshaft 154 can be further operatively coupled to the tip 112 via a retainer pin 160, a head pin 162, and a bearing 164, as shown in FIGS. 19 and 33, so that rotation of the camshaft 154 causes rotation, oscillation, and/or vibration of the tip 112 and/or and the bristles 118. In particular, as shown in FIG. 19, the bearing 164 can be coupled to an inner surface of the post 110 to position the camshaft 154 within the internal compartment 156. The retainer pin 160 and the head pin 162 operatively couple the camshaft 154 to gears or mechanical components 165 of the tip 112, which act to move the bristles 118 when the camshaft 154 is rotated. In another implementation, as shown in FIG. 33, the toothbrush 302 can include the camshaft 154, the retainer pin 160, the head pin 162, the tip gears 165, and an upper bearing block 167. The upper bearing block 167, similar to the bearing 164, can help position the camshaft 154 within the internal compartment 156, and can also be coupled to the post 110 in order to help substantially enclose the internal compartment 156 at the top end 114 of the head 102. It should be noted that, while the camshaft 154 is shown and described herein, other electronic or mechanical mechanisms for causing rotation, vibration, or oscillation of the bristles 118 via the motor 122 may be contemplated in some implementations.

As noted above, the PCB assembly 140 can control the motor 122. In particular, the PCB assembly 140 can operate the motor 122 based on input or feedback from the user interface 138. For example, the user interface 138 can include a button 166 located on an outside of the housing 126 and in communication with the PCB assembly 140, as shown in FIGS. 6-8 and 12A. In one implementation, the button 166 can be a flexible button overmolded on the housing 126. Furthermore, in one implementation, the PCB assembly 140 can operate the motor 122 for a predetermined or preset time period, such as two minutes, when the button 166 is pressed or actuated by an operator. In other words, the PCB assembly 140 can include an internal timer that is activated when the button 166 is pressed (similar to that discussed above with respect to FIGS. 1-5). In another implementation, the PCB assembly 140 can operate the motor 122 when the button 166 is pressed a first time, and can stop motor operation when the button 166 is pressed a second time (and, thus, the button 166 operates as an on/off button). While the button 166 is shown and described herein, other implementations may contemplate other types of user interfaces such as, but not limited to, switches or dials.

Additionally, the handle 104 can include a light source 168 that indicates when the motor 122 is being operated. For example, the light source 168 can be controlled by the PCB assembly 140 based on feedback from the user interface 138 (e.g., such as feedback that initiates operation of the motor to actuate the bristles 118, or other feedback). In other words, the light source 168 can be turned on when the motor 122 is operating and turned off when the motor 122 ceases operation. In one example, as shown in FIGS. 6-10, 12A-12C, 26-27, and 30-31, the light source 168 can include one or more internal light emitting diodes (LEDs) 170 emitting light outward from the handle 104 via a light pipe 172. As shown in FIG. 12B, the internal LEDs 170 can be operatively coupled to the PCB assembly 140 and in communication with the light pipe 172.

Figure 34:
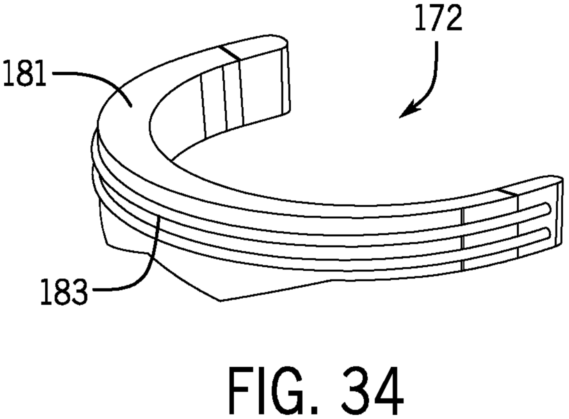
FIG. 34 is a perspective view of a light pipe of the electric toothbrush of FIG. 30.

Accordingly, as shown in FIG. 7, the housing 126 can include an opening 173 that receives the light pipe 172. Illustratively, the light pipe 172 can generally extend around a portion of the handle 104 to provide sufficient lighting during operation, as further described below. In some implementations that light pipe 172 can extend around over half of an outer circumference of the handle 104 (however, half, or less than half of the circumference may also be contemplated). Furthermore, FIG. 34 illustrates the light pipe 172 according to one implementation. A top face 181 of the light pipe 172 can be diffused, for example, to increase a viewing angle of the outgoing light from the LEDs 170, and side faces 183 may fit into the opening of the housing 126. In some implementations, however, the top face 181 may be substantially clear.

In another example, as shown in FIGS. 18-23B, the light source 168 can include one or more internal LEDs 170 emitting light outward from the handle 104 via a lens 174 that sits in an opening 179 of the housing 126. The light pipe 172 and/or the lens 174 may be sealed onto or into the housing 126 by an overmold to ensure the sealed compartment 136 within the housing 126 is substantially sealed from the ambient environment.

Figure 12C:
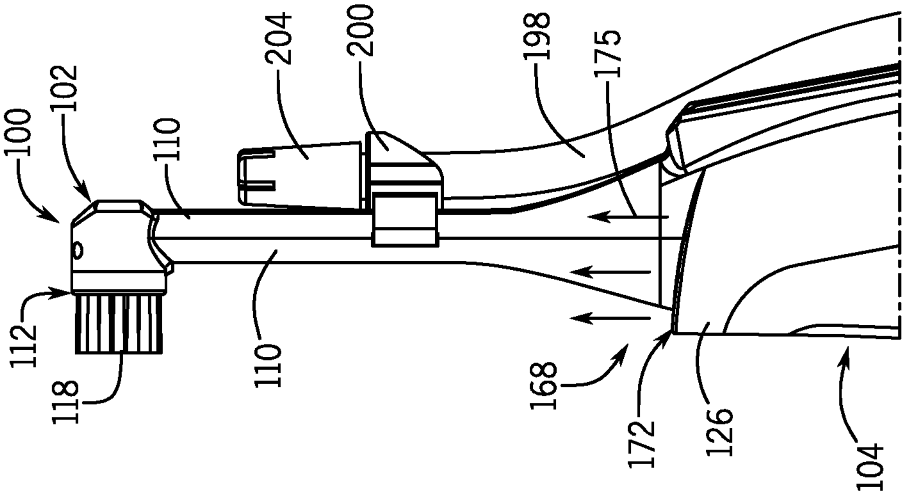
FIG. 12C is a partial side view of the electric toothbrush of FIG. 6.
Figure 12B:
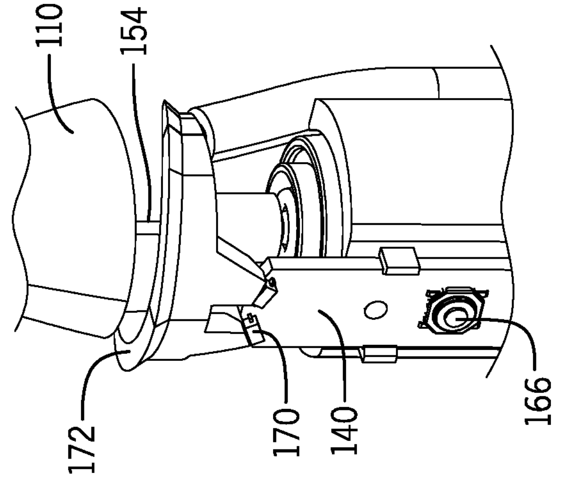
FIG. 12B is a partial perspective view of the electric toothbrush of FIG. 6 with a housing removed.
Figure 12A:
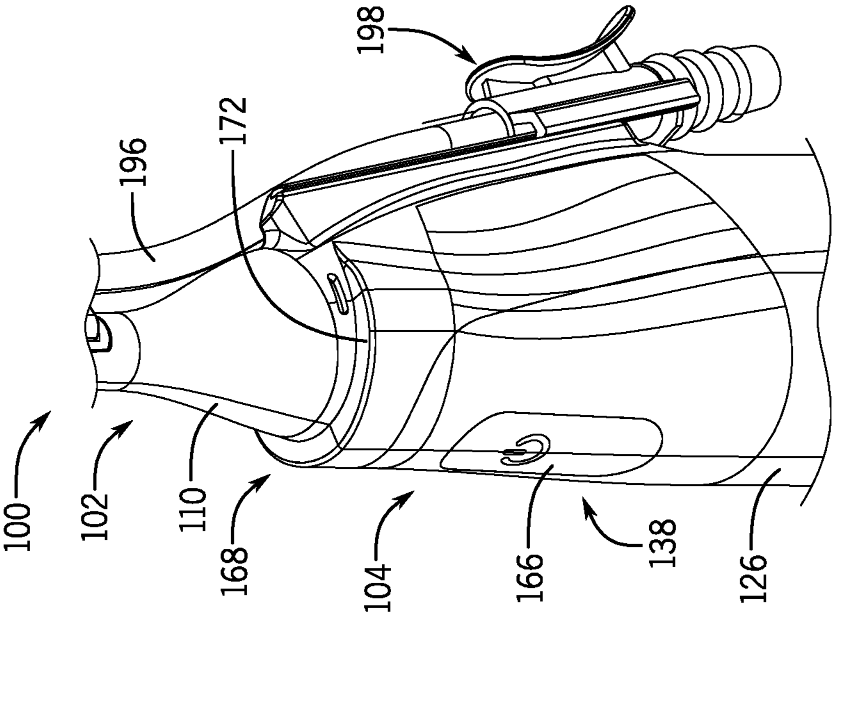
FIG. 12A is a partial perspective view of the electric toothbrush of FIG. 6.

As shown in FIGS. 12A-12C, 18-23B, and 26-32, the light pipe 172 and the lens 174 can be positioned on the handle 104 in order to direct light emitted by the LEDs 170 away from the handle 104 and toward the head 102 (e.g., as shown in by arrows 175 in FIG. 12C). As a result, in addition to indicating motor operation, the light source 168 can assist with and/or improve visibility during toothbrush operation (for example, so that an operator can better view the patient's oral cavity during use). In some embodiments, the light source 168 can also provide additional indications to an operator (e.g., such as emitting a continuous light or a flashing light based on toothbrush operation). Accordingly, the LEDs 170 may be white or colored, such as red or green. Furthermore, because the LEDs 170 are internal, with the light pipe 172 and/or the lens 174 molded into the handle 104, the light source 168 may not affect the ergonomics of the handle 104 or the small profile of the head 102. Additionally, while the LEDs 170 are shown and described as internal and directly coupled to the PCB assembly 140, in some implementations, the LEDs 170 may be located anywhere along the toothbrush 100—internally or externally—while still in communication with and operated by the PCB assembly 140.

Figure 32:
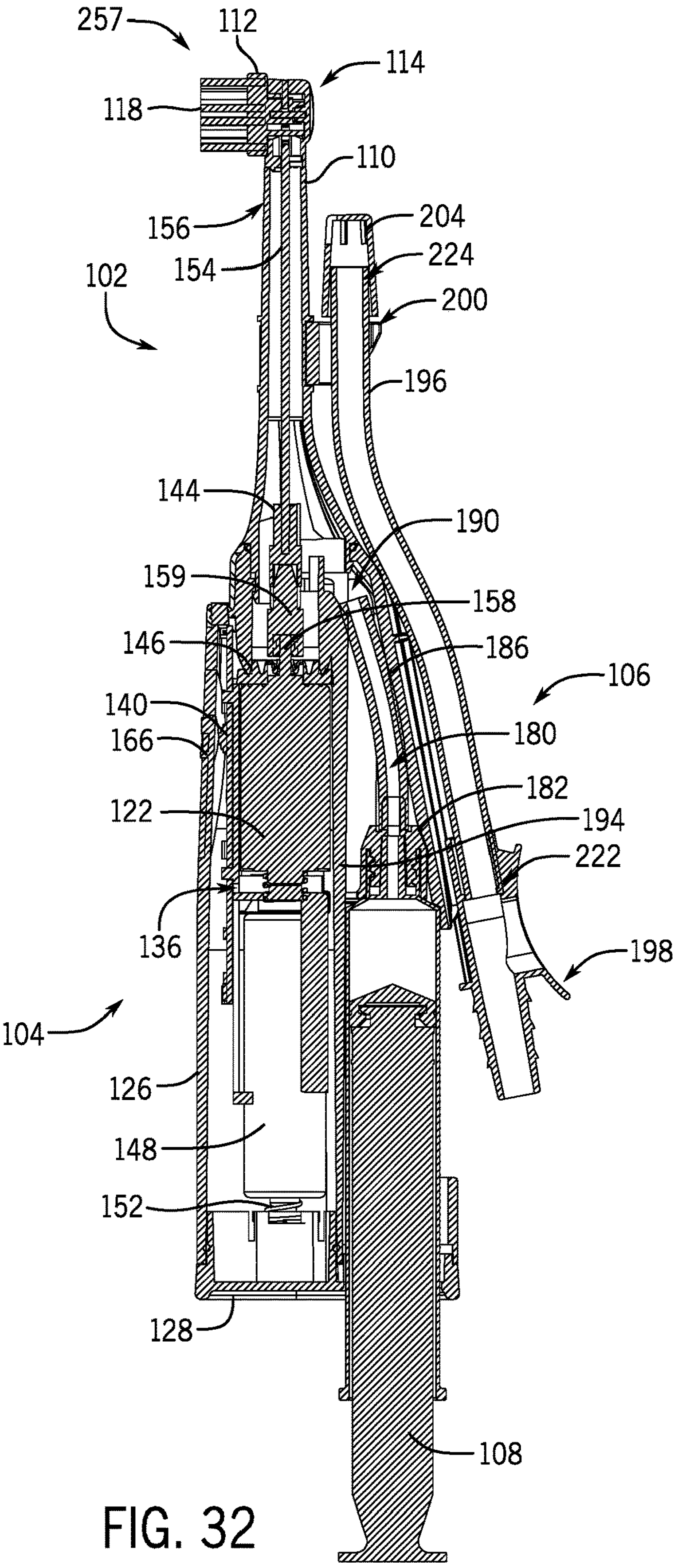
FIG. 32 is a side cross-sectional view of the electric toothbrush of FIG. 30.

The LEDs 170, as well as the PCB assembly 140 and the motor 122, can be powered by the batteries 148. As shown in FIGS. 6, 7, and 32 the batteries 148 can generally sit within and extend upward from a cavity 177 at least partially defined by the end cap 128. Also, the battery springs 152 can be positioned at one or both ends of the batteries 148 to ensure that the batteries 148 properly contact positive battery contacts 150 and negative battery contacts (not shown), which are further connected to the PCB assembly 140 and/or the motor 122. The batteries 148 may be removed and/or replaced by uncoupling the end cap 128 from the housing 126, permitting access to the sealed compartment 136 of the housing 126 in which the batteries 148 are housed. While removable batteries 148 are illustrated and described herein, other implementations of the present disclosure may include one or more permanent or removable rechargeable batteries, as described above. In other implementations, the batteries may be configured as permanent, non-removable batteries.

The PCB assembly 140, the motor assembly (including at least the motor 122, the motor chassis 142, and the coupler 144 and/or the coupler 159), the LEDs 170, and the batteries 148 can be housed within one or more compartments in the housing 126, such as the sealed compartment 136. As described above, the compartment 136 may be sealed from the ambient environment via the end cap 128 and the gasket 134 on a bottom end 130 of the housing 126. At a top end 132 of the housing, the compartment 136 may be sealed by the seal 146. More specifically, as shown in FIGS. 8A, 8B, 20, and 32, the seal 146 can be located in an upper opening 176 of the compartment 136, thus sealing the compartment 136 from the head 102. However, the seal 146 can include a throughhole 178, as shown in FIG. 7, sized to receive the camshaft 154. As a result, the camshaft 154 can be routed through the seal 146 to connect to the coupler 144 within the compartment 136. Alternatively, in some implementations as shown in FIG. 33, the motor shaft 158 can extend through the seal 146 and connect to the coupler 159 outside of the compartment 136. Accordingly, in general, the seal 146, the gasket 134, and the end cap 128 can seal the compartment 136, allowing the compartment 136 to remain substantially dry even when liquid is routed through the handle 104 and the head 102, as further discussed below.

Regarding irrigation functionality of the toothbrush 100, the housing 126 can be configured so that a syringe 108 can be threaded or routed into the handle 104, allowing fluid in the syringe 108 to be selectively ejected through the irrigation ports 124 of the tip 112. More specifically, as shown in FIGS. 7, 8A, 8B, 20, and 32, the handle 104 can include an irrigation compartment 180 with a hinge 182, one or more screws 184, and an irrigation tube 186. The irrigation compartment 180 can be in fluid communication with the irrigation ports 124 and sized to receive at least a portion of the syringe 108, as shown in FIGS. 6-10, 13A-13B, 15A-15B, 21-22, 26-27, and 30-32. In particular, the irrigation compartment 180, and more specifically the end cap 128, can include a lower opening 188 to receive the syringe 108. In one implementation, as shown in FIG. 10, the irrigation compartment 180 can be sized so that a conventional syringe 108 fits within the irrigation compartment 180 and extends out from the lower opening a distance H2, such as about 0.6 inches.

In some implementations, the irrigation compartment 180 can also include a side opening 192 that acts as a viewing window so that an operator can view a portion of the syringe 108 inside the irrigation compartment 180. For example, the side opening 192 can enable the operator to view a level of liquid in the syringe 108 when the syringe 108 is inserted into the irrigation compartment 180. Additionally, because the syringe 108 is routed through the end cap 128 at the bottom end 130 of the handle 104, the syringe 108 does not impede an operator's grip on the handle 104 or affect the profile of the head 102 (thus still enabling easy use and insertion into a patient's oral cavity). An operator can also easily replace the syringe 108 during use of the toothbrush 100 (e.g., while the head 102 is in a patient's mouth).

The irrigation compartment 180 can further include an upper opening 190 at the top end 132 of the housing 126 (e.g., adjacent to the internal compartment 156 of the head 102) to permit communication between the irrigation compartment 180 and the head 102. The hinge 182 can be internally coupled to the housing 126 within the irrigation compartment 180 (for example, to an internal wall 194 of the housing 126, as discussed below) via the screws 184. As shown in FIGS. 7, 8B, 20, and 32, the hinge 182 can be a luer hinge with a lower connector 193 configured to connect to a luer-lock type syringe 108. However, in other implementations, the hinge 182 can include different arrangements or connectors, such as, but not limited to, screw-type connectors or needleless access connectors, to accommodate other syringe types. The hinge 182 can further include an upper connector 195 configured to be coupled to the irrigation tube 186, for example, via a pressure fit.

In some implementations, the irrigation tube 186 can be routed from the hinge 182 in the irrigation compartment 180, through the upper opening 190, and into the head 102, as shown in FIGS. 19 and 20. More specifically, the irrigation tube 186 can terminate within the head 102 adjacent the upper opening 190. In other words, the irrigation tube 186 does not extend through the internal compartment 156 all the way to the irrigation ports 124. Because the head 102 does not have to accommodate the irrigation tube 186 through its entire length, it can maintain a substantially narrow profile. In some implementations, however, the irrigation tube 186 may extend some or all of the length of the internal compartment 156 and terminate at the irrigation ports 124. In other implementations, the irrigation tube 186 terminates within the handle 104 rather than extending into the internal compartment 156 of the head 102. For example, as shown in FIG. 32, the irrigation tube 186 can terminate at or prior to the upper opening 190 of the irrigation compartment 180.

Accordingly, in use, an operator can insert the syringe 108 through the lower opening 188 until the syringe 108 connects with the hinge 182. For example, as shown in FIG. 27, the syringe 108 can be inserted directly upward through the lower opening 188 (as indicated by arrow 197). In some implementations, the operator may need to twist the syringe 108 to ensure a proper connection between the syringe 108 and the lower connector 193 of the hinge 182. Once the syringe 108 is connected to the hinge 182, the syringe 108 is fluidly connected to the irrigation ports 124 via the hinge 182, the irrigation tube 186, and the internal compartment 156 of the post 110. More specifically, the operator can expel an irrigant, such as but not limited to water, saline, or another fluid, through the irrigation ports 124 by actuating the syringe 108. For example, as shown in FIG. 28, when the operator actuates the syringe 108, fluid 199 within the syringe 108 is expelled through the hinge 182 and the irrigation tube 186, into the internal compartment 156, and exits the internal compartment 156 via the irrigation ports 124. Due to the placement of the syringe 108, such actuation can be done while the toothbrush 100 is in the patient's oral cavity, as shown in FIG. 28.

Additionally, in some embodiments, the irrigation tube 186 can be replaced with a channel (not shown) integrated into the housing 126 and configured to direct fluid from the hinge 182 to the head 102. As such, the irrigation tube 186 and/or the channel can act to direct water from the hinge 182 to the head 102 so that stagnant fluid does not remain in the irrigation compartment 180. In some implementations, if water is present in the irrigation compartment 180, an operator can, for example, remove the head 102 so that the irrigation compartment 180 is accessible to rinse out and/or dry out.

While the internal compartment 156 of the head 102 (and, in some implementations, the irrigation compartment 180 of the handle 104) may be flooded with fluid, the sealed compartment 136 can remain sealed from the internal compartment 156, the irrigation compartment 180, and the ambient environment. In particular, as described above, the sealed compartment 136 can be sealed from the internal compartment 156 via the seal 146. And as shown in FIGS. 8A-8B, 20, and 32, the sealed compartment 136 can be sealed from the irrigation compartment 180 by the internal wall 194 of the housing 126. The sealed compartment 136, containing electrical components such as the motor 122 and the PCB assembly 140, is therefore a dry compartment sealed from all wet compartments 136, 156 of the toothbrush 100. Additionally, in some implementations, as shown in FIG. 31, the toothbrush 257 can include a seal 201 positioned between the head 102 and the handle 104 to prevent fluid in the irrigation compartment 180 or the internal compartment 156 from leaking out of the toothbrush 257 to the ambient environment.

Referring now to suction operation of the toothbrush 100, in some implementations, the external suction assembly 106 can be at least partially detachable from and/or adjustable relative to the head 102 and/or the handle 104 and can be coupled to tubing 109 of an external suction device. As shown in FIGS. 6-32, the suction assembly 106 can include a suction tube 196, a slider 198, a guide 200, and a track 202. In some implementations, the suction tube 196 can be moveable along an outside of the housing 126 so that a suction tip 204 of the suction tube 196 is movable relative to the head 102 (such as between a first position below the tip 112 and a second position adjacent or above the tip 112, as further described below).

Figure 13A:
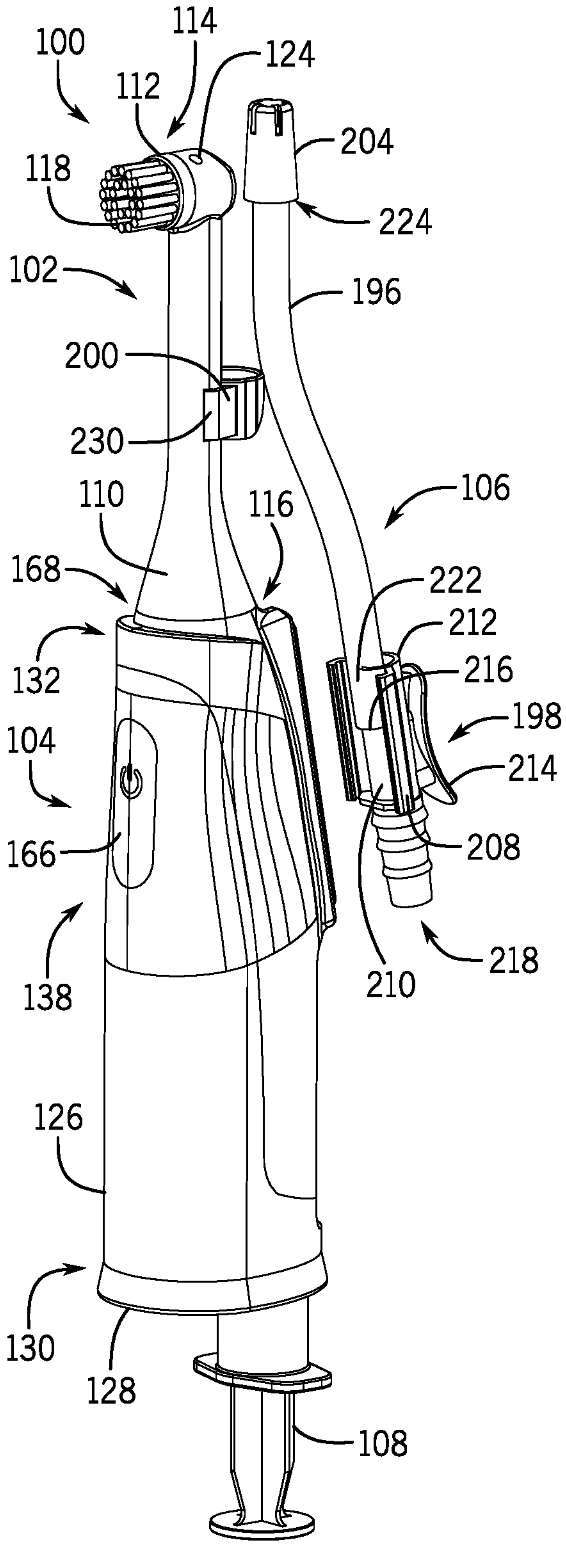
FIG. 13A is a front perspective view of the electric toothbrush of FIG. 6.
Figure 13B:
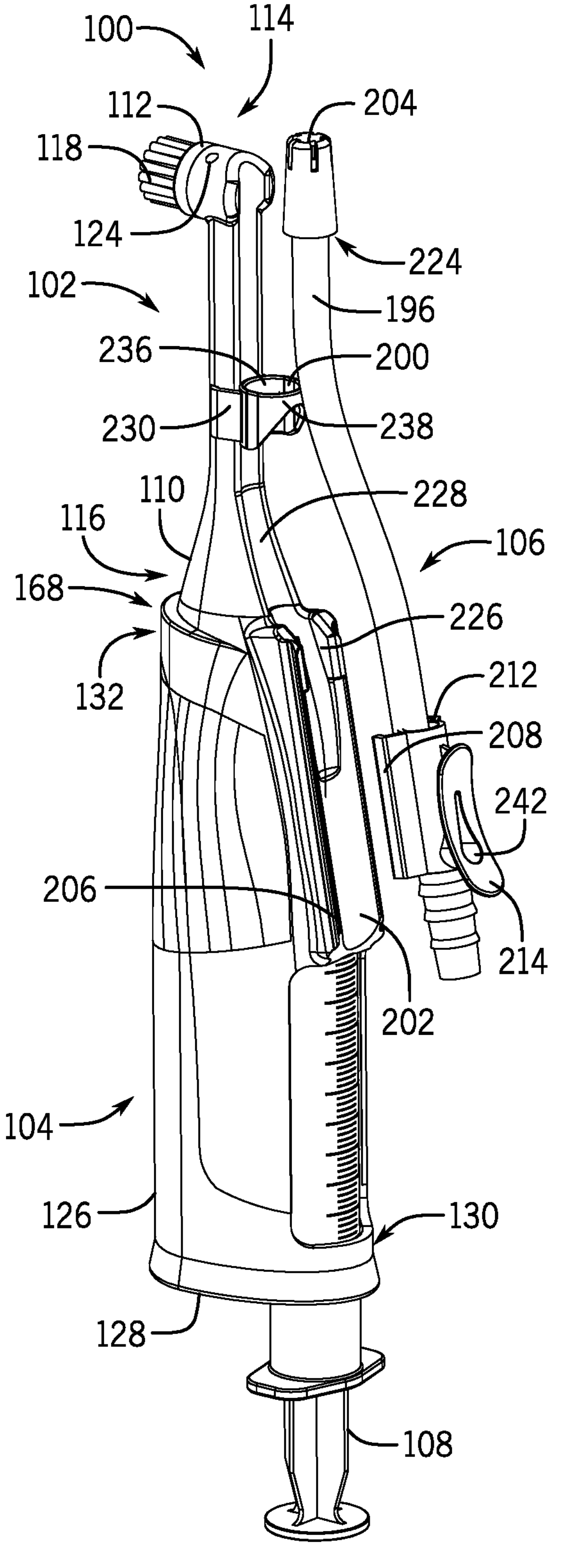
FIG. 13B is a rear perspective view of the electric toothbrush of FIG. 6.
Figure 14:
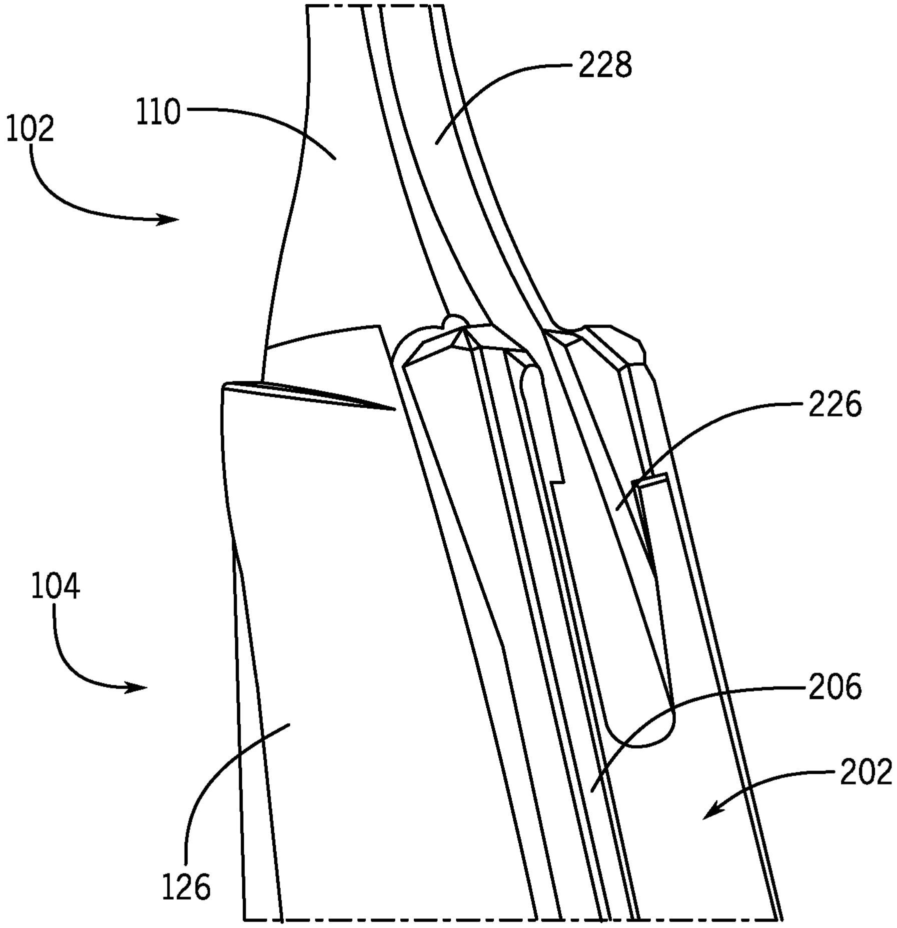
FIG. 14 is a partial rear perspective view of the electric toothbrush of FIG. 6 with a suction assembly removed.

More specifically, the track 202 can be coupled to or integral with the handle 104. The track 202 can be positioned on the outside of the housing 126, for example opposite the button 166, and can extend a portion of the length of the housing 126. In one implementation, as shown in FIGS. 13A-13B, 26-27, and 31, the track 202 can extend from a first location (e.g., the upper opening 190 at the top end 132 of the housing 126) to a second location (e.g., the side opening 192 of the irrigation compartment 180, or another location along a length of the handle 104). As shown in FIGS. 13A-14, the track 202 can include grooves 206 that correspond to mating edges 208 of the slider 198 so that the edges 208 can engage (e.g., snap or slide into) the grooves 206 and slide back and forth along the track 202. As shown in FIG. 14, the track 202, including the grooves 206, can be substantially smooth to permit safe use of the toothbrush 100 when the suction assembly 106 is detached.

As shown in FIGS. 13A-13B and 31, the slider 198 can include the edges 208, as described above, a tube portion 210, a cover 212, and a thumb portion 214. The tube portion 210 can include a top edge 216 sized and configured to receive the suction tube 196 and a bottom edge or suction connection 218 sized and configured to be coupled to an external suction device (e.g., to tubing 109 of the external suction device, as shown in FIGS. 26-27). For example, the edges 216, 218 can be sized and/or have threading or grooves to enable a pressure fit between the edges 216, 218 and respective tubing 196, 109.

Figure 15A:
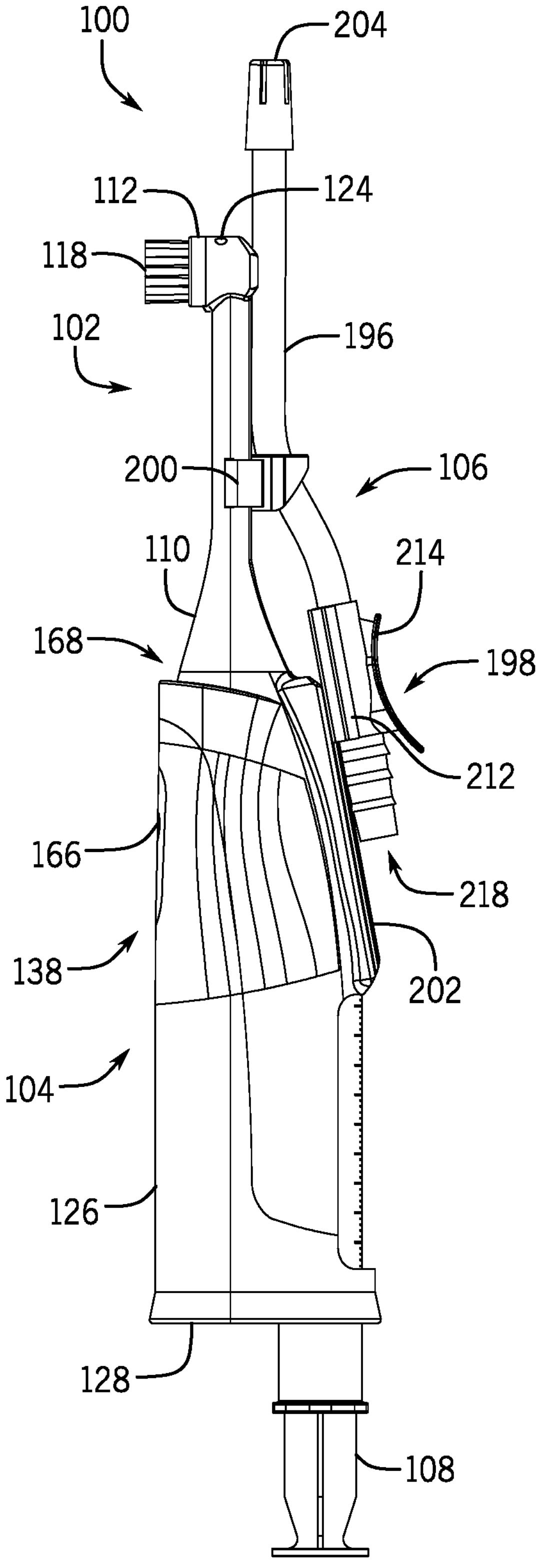
FIG. 15A is a side view of the electric toothbrush of FIG. 6 configured in a suction use position.
Figure 15B:
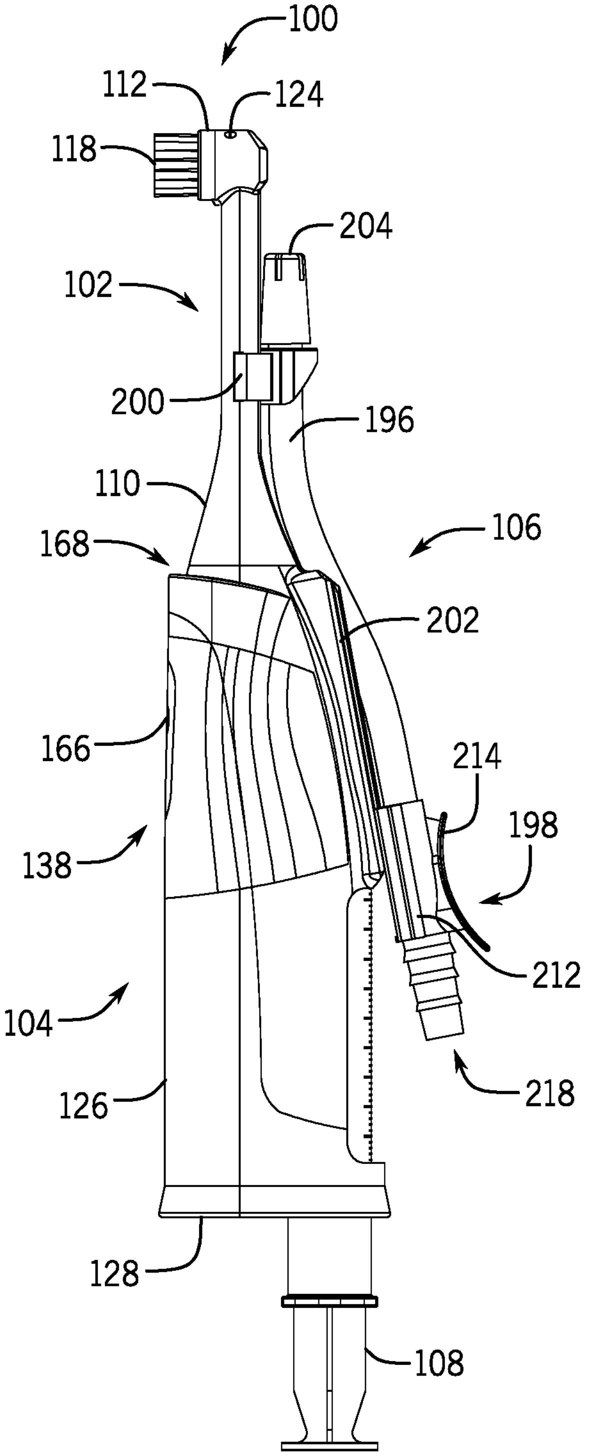
FIG. 15B is a side view of the electric toothbrush of FIG. 6 configured in a suction non-use position.
Figure 17:
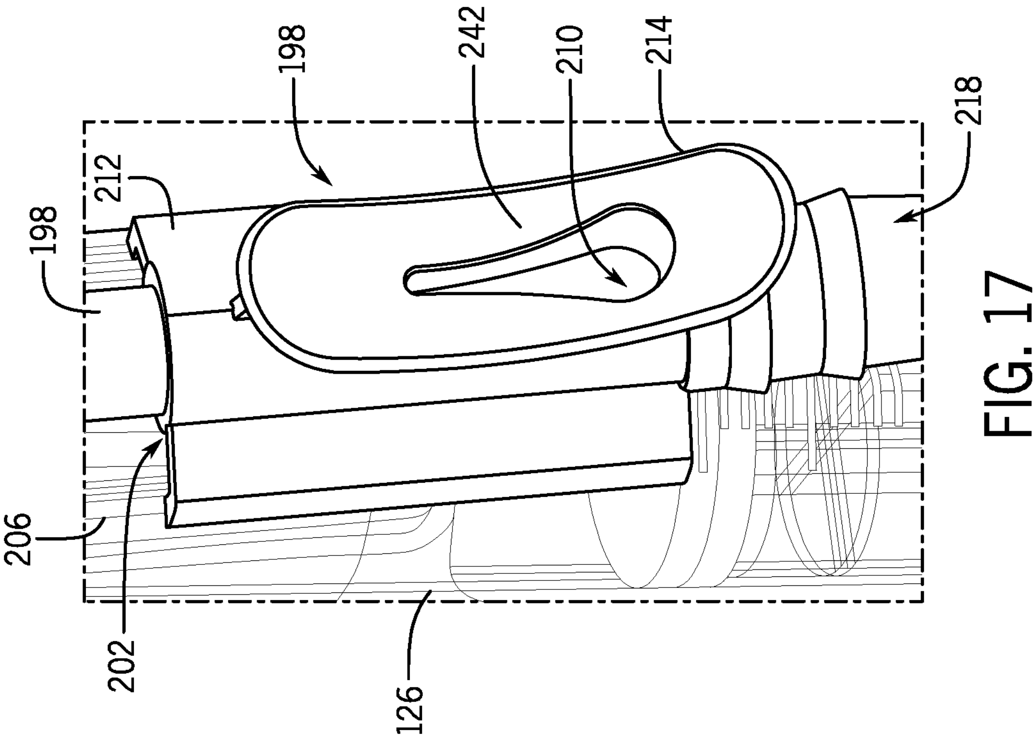
FIG. 17 is a partial rear perspective view of a slider of the electric toothbrush of FIG. 6 with at least a portion of a handle transparent.

The thumb portion 214 can be positioned along the outside of the cover 212 and can be flat or slightly curved and sized so that an operator's thumb can comfortably rest on the thumb portion 214 while operating the toothbrush 100. Furthermore, an operator can engage the thumb portion 214 with his or her thumb to move the slider 198 up and down along the track 202. For example, the operator can engage the thumb portion 214 to move the slider 198 up the track 202 toward a suction use position, as shown in FIGS. 15A and 29. The operator can also engage the thumb portion 214 to move the slider 198 down the track 202 toward a suction non-use position, as shown in FIGS. 15B and 28.

As shown in FIGS. 6-32, the suction tube 196 can be a flexible tube including the suction tip 204 at one end 224, such as a disposable saliva extractor or saliva ejector. An opposite end 222 of the suction tube 196 can be coupled to the top edge 216 of the tube portion 210, for example via a pressure fit, as described above. For example, the tube portion 210 can be sized to receive the suction tube 196 (that is, the end 222 of the suction tube 196 can be slid into or over the tube portion 210). In implementations where the suction tube 196 is slid over the tube portion 210, the cover 212 can substantially cover this connection between the suction tube 196 and the tube portion 210 so that the connection is positioned between the housing 126 and the cover 212 when the slider 198 is attached to the track 202. As a result, the cover 212 can substantially protect this coupling so that an operator does not pull or push the suction tube 196 off the slider 198 when moving the slider 198 along the track 202.

In some implementations, as shown in FIGS. 13B-14, the handle 104 and the head 102 (e.g., including the post 110 and the tip 112) can include grooves 226, 228, respectively, sized to at least partially receive the suction tube 196. For example, as the suction tip 204 can be generally located adjacent a backside of the head 102 (e.g., opposite a front side of the head 102 including the bristles 118), the grooves 228 can be located along the backside of the head 102. Furthermore, the suction tube 196 can be slightly curved or flexible to follow the curved profile created by the grooves 226, 228. As a result, when the slider 198 is moved up and down the track 202, the suction tube 196 can move up and down the grooves 226, 228. Additionally, the grooves 226, 228 can be shaped to provide a gentler, or less steep, slope to permit smoother movement of the suction tube 196 when the slider 198 is slid along the track 202.

In other implementations, however, such as the toothbrush 250 of FIGS. 18-23B or the toothbrush 252 shown in FIG. 24, the head 102 and the handle 104 may not include grooves. Furthermore, in some implementations, such as the toothbrush 255 of FIG. 26, the handle 104 and the tip 112 can each include grooves 226, 228, but not the post 110. In any such implementations, the suction tube 196 can still be slightly curved to flexible to generally follow the curved profile of the head 102 and the handle 104, thus maintaining a small profile of the toothbrush 100.

Referring back to FIGS. 6-10, 13A-13B, and 15A-16, the guide 200 can be positioned on the head 102 and sized to engage, or at least partially circumscribe, the suction tube 196. The guide 200 can thus maintain the suction tube 196 positioned against the head 102 (and against the grooves 226, 228), when the suction tube 196 is moved via the slider 198. As a result, the profile of the head 102, including the suction tube 196, remains substantially small to permit easier use of the toothbrush 100 for patients who have difficulties opening their mouths due to a restricted range of oral motion or have physical barriers that hamper access to the patient's oral cavity. For example, the guide 200 in combination with the grooves 226, 228 permits the toothbrush 100 of FIGS. 6-17 to have a smaller profile than the toothbrushes 250, 252 of FIGS. 18-24.

In some implementations, the guide 200 can be integral with or removably coupled to the head 102 and, more specifically, the post 110. For example, as shown in FIG. 7, the guide 200 can include wings 230 that normally flex inward toward each other and include protrusions 232 on each end. The guide 200 can be pressed onto the head 102 until the protrusions 232 lock into matching notches 234 on the head 102, thus coupling the guide 200 to the head 102. FIGS. 26-29 illustrate the toothbrush 255 with similar notches 234 as shown in FIG. 7. FIGS. 30-33 illustrate the toothbrush 257 with a circumferential notch 235, which may function similar to the notches 234 of FIGS. 7 and 26-28; however, as shown in FIG. 33, the guide 200 may include wings 230 capable of locking around the circumferential notch 235 (e.g., without requiring additional protrusions).

In some implementations, once attached, the guide 200 remains on the head 102 (while still permitting the suction tubes 196 and/or the slider 198 to be removed and replaced, as described below). The permanent, or semi-permanent, guide 200 can thus reduce waste but still allow for replacement of suction tubes 196 to enable sanitary reuse of the toothbrush 100. In some aspects, the suction tubes 196 and/or the slider 198 can be replaced after each use of the toothbrush 100. For example, the slider 198 can be slid or snapped off the track 202 and the suction tube 196 can be slid out from the guide 200, as shown in FIGS. 13A-13B, and one or both components can then be discarded. In one implementation, these components can be detached from the toothbrush 100 by pulling the suction tube 196 upward away from the track 202 (and thus sliding the slider 198 off the track 202). In other aspects, the suction tubes 196 and/or the slider 198 can be replaced after more than one use of the toothbrush 100 (e.g., after two or more uses of the toothbrush 100) and/or may be interchanged (e.g., taken off to allow an operator to use a different suction tube 196 and/or slider 198, then put back on the toothbrush 100).

Additionally, in some implementations, the notches 234, 235 and, thus, the guide 200 can be positioned on the head 102 so that the guide 200 acts as a stopper mechanism. For example, the guide 200 can be positioned along the head 102 so that, when the suction tube 196 is moved downward, the suction tip 204 will reach the guide 200 before the slider 198 is slid completely off a lower edge of the track 202. Thus, when suction is not desired, the operator can move the slider 198 downward until the suction tip 204 reaches the guide 200, thereby placing the suction tube 196 in the suction non-use position, as shown in FIG. 15B.

Figure 16:
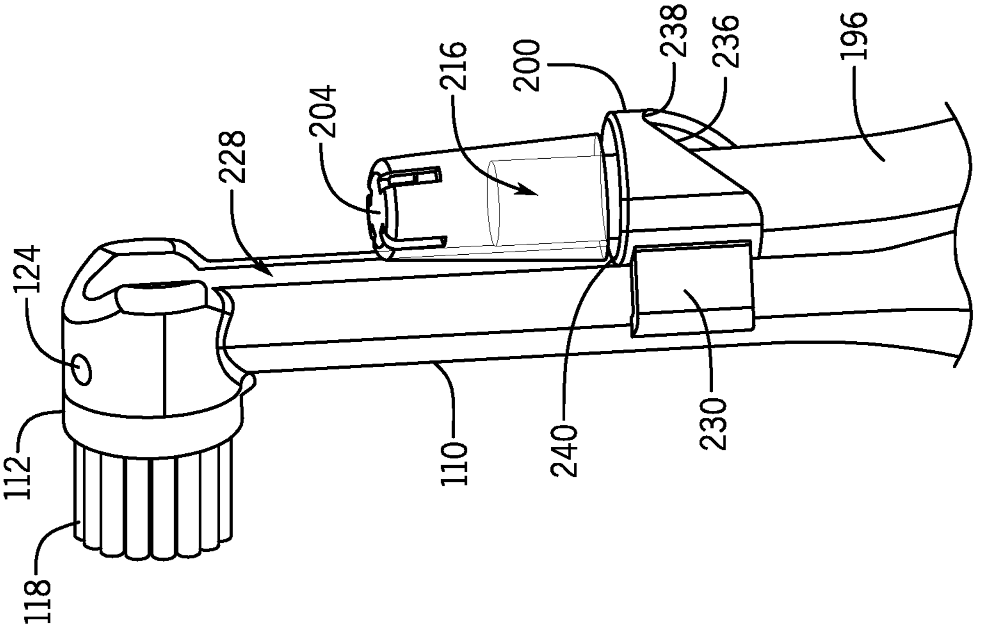
FIG. 16 is a partial rear perspective view of a head of the electric toothbrush of FIG. 6 with a suction tip transparent.

In some implementations, the guide 200 can also include a substantially low-friction inner surface 236, permitting smooth movement of the suction tube 196 through the guide 200. Furthermore, as shown in FIG. 16, an outer portion 238 of the guide 200 can be shorter than an inner portion 240 to enable less contact surface 236 (and therefore less opportunity for friction) between the guide 200 and a moving suction tube 196. However, in other implementations, as shown in FIG. 25, the toothbrush 254 can include a larger guide 200 with a longer outer portion 238. The guide 200 of FIG. 25 operates to maintain the suction tube 196 within the grooves of the head 102. However, the longer outer portion 238 of the guide 200 shown in FIG. 25 may create more contact surface between the guide 200 and the suction tube 196 and, thus, create more friction when an operator slides the suction tube 196 through the guide 200. The additional friction makes sliding the suction tube 196 more difficult (that is, the movement is less smooth). Additionally, in another implementation, as shown in FIG. 33, the toothbrush 257 can include a partially open guide 200 having an opening 241 along its outer portion 238.

FIGS. 18-23B illustrate the toothbrush 250 including an alternate suction assembly 106. As shown in FIGS. 18-23B, the suction assembly 106 can include a suction tube 196, a slider 256, a guide 258, and a track 260. The suction assembly 106 can be moveable along the outside of the housing 126 so that a suction tip 204 of the suction tube 196 moves between a first position adjacent or below the tip 112 and a second position above the tip 112, as further described below.

Figure 21:
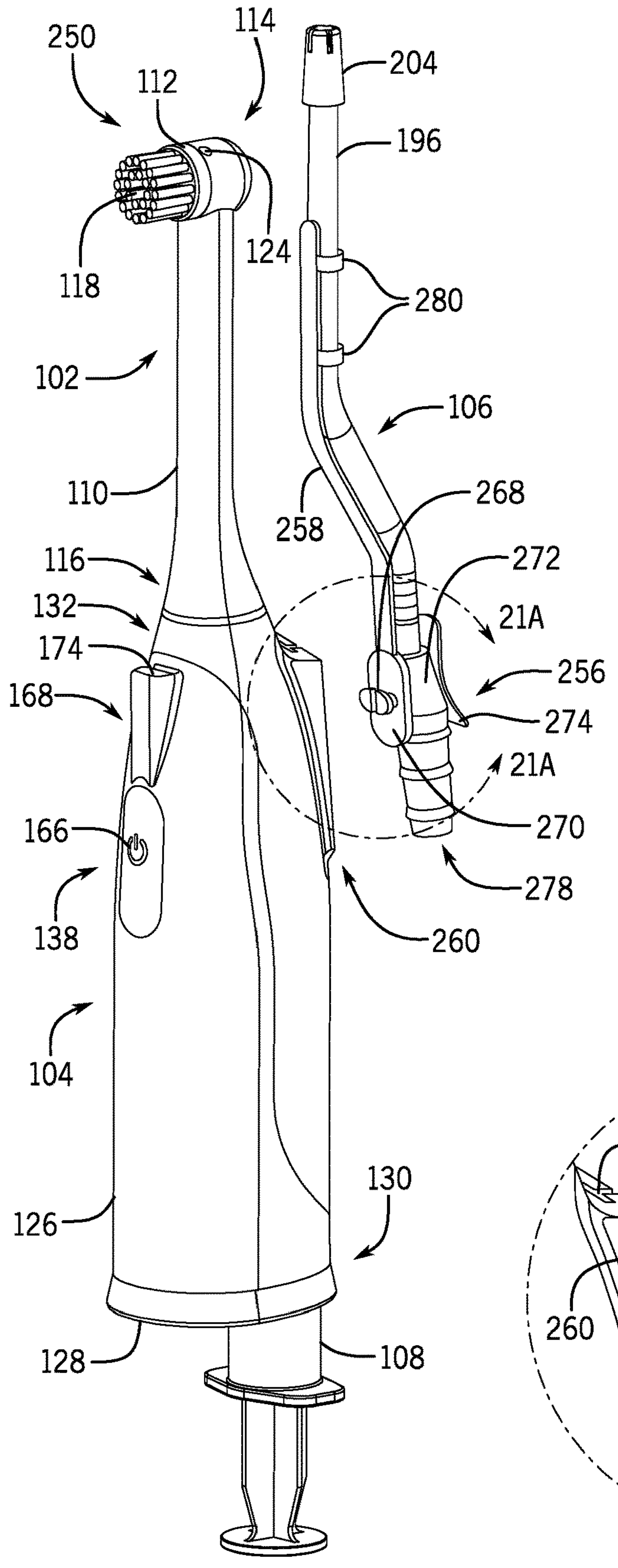
FIG. 21 is a front perspective view of the electric toothbrush of FIG. 18.
Figure 21A:
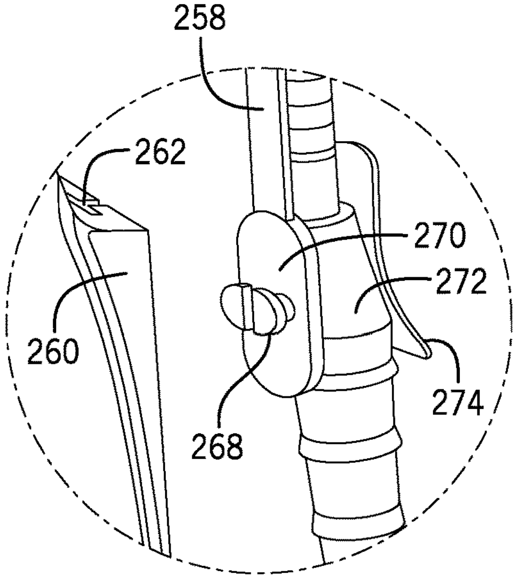
FIG. 21A is a partial front perspective view of the electric toothbrush of FIG. 18, taken from circle A of FIG. 21.

The track 260 can be coupled to or integral with the handle 104. The track 260 can be located on the outside of the housing 126, for example opposite the button 166, and can extend a portion of the length of the housing 126. The track 260 can include an open end 262, a closed end 264, and ribs 266, as shown in FIGS. 22-23B. The track 260 can also correspond to a protrusion 268 of the slider 256 so that the protrusion 268, as shown in FIG. 21A, can snap into the open end 262 and slide up and down along the track 260.

As shown in FIGS. 20-22A, the slider 256 can include the protrusion 268, as discussed above, a flat piece 270, a tube portion 272, and a thumb portion 274. The flat piece 270 can separate the tube portion 272 from the protrusion 268, can add extra rigidity and strength to the slider 256, and can help ensure that the slider 256 lies flat against the track 260. Like the tube portion 210 of FIGS. 6-17, the tube portion 272 can include a top edge 276 sized and configured to receive the suction tube 196 and a bottom edge or suction connection 278 sized and configured to be coupled to an external suction device (now shown). For example, the edges 276, 278 can be sized and/or have threading or grooves to enable a pressure fit between the edges 276, 278 and respective tubing 196, 109.

The thumb portion 274 can be positioned along the outside of the tube portion 272 (opposite the flat piece 270) and can be flat or slightly curved and sized so that an operator's thumb can comfortably rest on the thumb portion 214 while operating the toothbrush 250. For example, illustratively, the thumb portion 274 can have a steeper curve than the thumb portion 214 of FIGS. 6-17. An operator can engage the thumb portion 274 with his or her thumb to move the slider 256 up and down along the track 260. More specifically, the operator can engage the thumb portion 274 to move the slider 256 up the track 260 toward a suction use position, as shown in FIG. 23A (where the suction tip 204 extends past the tip 112). The operator can also engage the thumb portion 274 to move the slider 256 down the track 260 toward a suction non-use position, as shown in FIG. 23B (where the suction tip 204 is adjacent to or below the tip 112, such as between the tip 112 and the handle 104).

As shown in FIGS. 18 and 21-23B, the guide 258 can be coupled to or integral with the slider 256. As such, unlike the guide 200 of FIGS. 6-17 and 24-33, the guide 258 is not coupled to the head 102. In particular, the guide 258 can extend upward from the slider 256 and can include one or more tubular wings 280 sized to at least partially circumscribe the suction tube 196. Furthermore, the guide 258 can be substantially rigid, in comparison to the suction tube 196, and can be curved to follow the curved profile of the toothbrush 250. The guide 258 can thus maintain the suction tube 196 positioned against or adjacent the head 102 when the suction tube 196 is moved via the slider 256. As a result, the profile of the head 102, including the suction tube 196, remains substantially small to permit easier use of the toothbrush 250 for patients who have difficulties opening their mouths.

In some implementations, the slider 256, the guide 258, and/or the suction tube 196 can be produced together as a single-use kit for use with toothbrush 250. In such implementations, the slider 256, the guide 258, and/or the suction tube 196 can be detached from the toothbrush 250 and discarded after one use (or, for example, two or more uses). For example, the slider 256 can be slid off the track 260 and the suction tube 196 can be routed through the guide 258 to detach the components from the toothbrush 250. In other implementations, the slider 256 and the guide 258 may be reusable, while the suction tube 196 can be removed and replaced to enable sanitary reuse of the toothbrush 250.

Figure 22A:
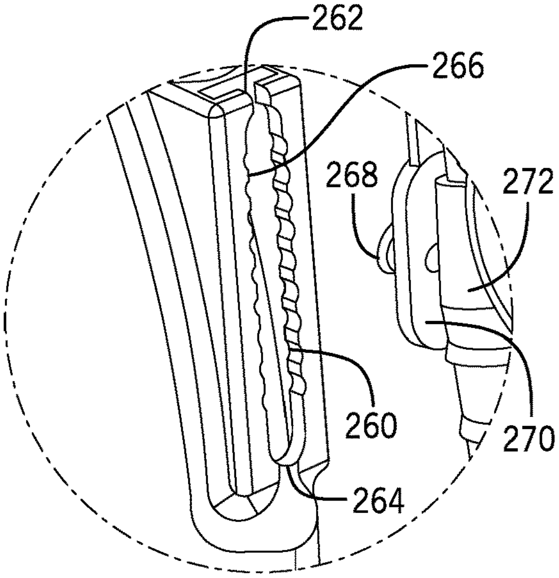
FIG. 22A is a partial rear perspective view of the electric toothbrush of FIG. 18, taken from circle A of FIG. 22.

As described above, the track 260 can include the open end 262, the closed end 264, and the ribs 266. The open end 262 enables an operator to detach the suction assembly 106 (e.g., at least the slider 256 and the suction tube 196) from the toothbrush 250 by pushing the slider 256 upward until the protrusion 268 is no longer within the track 260. Furthermore, the closed end 264 can act as a stopper mechanism, indicating that the suction tube 196 is in the non-use position. More specifically, the closed end 264 can be positioned along the handle 104 so that, when the suction tube 196 is moved downward as far as the track 260 allows, the suction tube 196 is in the non-use position, as shown in FIG. 23B. Additionally, as shown in FIG. 22A, the ribs 266 can act as friction members so that the slider 256 does not freely slide through the track 260 unless sufficient force is exerted on the thumb portion 274 (e.g., by an operator). The ribs 266 can also act as distance indicators so an operator can easily determine or know how far the suction tip 204 extends from the tip 112, for example, when the operator moves the slider 256 while the toothbrush 250 is in a patient's oral cavity.

Referring now to suction control of the suction assembly 106, in some implementations, the thumb portion 214 (or thumb portion 274) can include a suction hole or ventilation port 242, as shown in FIGS. 10, 13B, 17, 22, and 26. The ventilation port 242 may be substantially tear drop-shaped and can extend through the thumb portion 214 and the cover 212 and into the tube portion 210. Like the ventilation port 24 of FIGS. 1-5, as described above, when a suction source is coupled to the tube portion 210, suction or vacuum forces by the suction source will only reach the suction tip 204 if the ventilation port 242 is covered, for example by an operator's thumb. Otherwise, when uncovered, the ventilation port 242 acts as a vacuum release port to relieve suction within the suction tube 196. Accordingly, the ventilation port 242 can permit or relieve suction from the suction source to the suction tip 204 based on feedback from the operator. In this regard, the ventilation port 242, as well as the slider 198, can function as further components of an overall user interface 138 of the toothbrush 100.

Accordingly, in use, an operator can route a suction tube 196 through the guide 200 and connect the suction tube 196 to the end 222 of the tube portion 210. The operator can further connect the other end 224 of the tube portion 210 to a suction source. During brushing without suction, the operator can move the slider 198 downward so that the suction tip 204 is positioned below the tip 112 and uncover the ventilation port 242 (e.g., as shown in FIG. 29). When the operator desires suction, for example after irrigation, the operator can move the slider 198 upward so that the suction tip 204 is positioned adjacent to or above the tip 112 and can cover the ventilation port 242 (e.g., as shown in FIG. 30). In this manner, the suction tip 204 acts as a suction port of the toothbrush 100. The operator can also selectively cover part of the ventilation port 242 to adjust airflow through the suction tube 196 (for example, to permit less or more suction).

In some implementations, once the operator completes brushing, irrigation, and/or suction and removes the toothbrush 100 from the patient's oral cavity, the operator can remove the suction tube 196 from the tube portion 210 and the guide 200 and dispose of the suction tube 196. Alternatively, the operator can remove the entire suction assembly

106 (including the suction tube 196 and the slider 256) and dispose of the suction assembly 106. Furthermore, in some implementations, the operator can also (or alternatively) remove and dispose of the entire head 102. For example, as shown in FIGS. 26, 27, and 31, the head 102 can include one or more notches 244 that snap into apertures 246 of the handle 104. More specifically, the toothbrush 255 can include side notches 244 (as shown in FIGS. 26-27) and/or a rear notch (not shown), while the toothbrush 257 can include a rear notch 244 (as shown in FIG. 33). To install the head 102 onto the handle 104, the operator can press the head 102 into the handle 104 until the notches 244 snap into the apertures 246. To remove the head 102 from the handle 104, the operator can press each notch 244 through the aperture 246 to unseat it from the aperture 246 and pull the head 102 away from the handle 104. Other mechanisms for removably coupling the head 102 to the handle 104 may also be contemplated in some implementations. Once the one or more disposable items are removed from the toothbrush 100, the operator can attach a different head 102 and/or suction assembly 106 to the toothbrush 100 for sanitary re-use of the toothbrush 100.

The present disclosure has been described in terms of one or more preferred embodiments, and it should be appreciated that many equivalents, alternatives, variations, and modifications, aside from those expressly stated, are possible and within the scope of the present disclosure.

The invention claimed is:

1. A toothbrush comprising:

a head including a body and a tip, the tip including a plurality of bristles;

a handle coupled to the body, the handle having a housing;

a motor disposed within the housing and operatively coupled to the plurality of bristles; and a suction assembly including:

a suction tip disposed adjacent the plurality of bristles of the head, the suction tip having an inlet; and a suction coupler having an outlet configured to be coupled to a suction source, the outlet of the suction coupler being in fluid communication with the inlet of the suction tip;

wherein the suction coupler includes an externally accessible ventilation port in fluid communication with the inlet of the suction tip and the outlet of the suction coupler;

wherein an entirety of the suction assembly is external to the housing of the handle of the toothbrush, and wherein the suction assembly is coupled to the handle externally, such that the entirety of the suction assembly is configured to slide relative to the handle and externally to the head to adjust a position of the suction tip relative to the tip of the head, and such that a majority of the suction assembly and the body of the head are exposed to an external environment.

2. The toothbrush of claim 1, wherein the suction coupler includes a barbed tube fitting configured to be received in a tube of the suction source.

3. The toothbrush of claim 1, wherein the handle of the toothbrush includes a user interface device disposed on a first side of the handle and configured to control the motor, and the ventilation port of the suction assembly is disposed adjacent a second side of the handle opposite the first side of the handle.

4. The toothbrush of claim 1, wherein the handle is detachably coupled to the head.

5. The toothbrush of claim 1, wherein the motor is coupled to the plurality of bristles by a shaft extending into the body of the head.

6. The toothbrush of claim 1, wherein the plurality of bristles extend from the head in a first direction and the suction tip is oriented in a second direction nonparallel to the first direction.

7. The toothbrush of claim 1, wherein the handle includes a track and the suction assembly includes a slider configured to be movable back and forth along the track.

8. The toothbrush of claim 1, wherein the suction assembly is configured to slide between a non-use position in which the suction tip is positioned between the handle and the tip of the head, and a suction use position in which the suction tip is positioned beyond the tip of the head relative to the handle, wherein the suction tip is exposed to the external environment in both the suction use position and the non-use position.

9. The toothbrush of claim 1, wherein the suction assembly is configured to be selectively detached from the handle and the head of the toothbrush.

10. A toothbrush comprising:

a head having a body and a tip, the tip including a plurality of bristles;

a handle detachably coupled to the body of the head;

a bristle actuator disposed in an interior of the handle and configured to impart motion to the plurality of bristles; and a suction system including a suction intake port disposed adjacent the plurality of bristles, and a suction coupler configured to selectively couple the suction intake port to a suction source;

wherein the suction system is disposed entirely outside of the interior of the handle, and wherein the suction system is coupled to the handle externally, such that an entirety of the suction system is configured to slide relative to the handle to adjust a position of the suction intake port relative to the tip of the head, and such that a majority of the suction system and the body of the head are exposed to an external environment, and wherein the suction system is configured to slide between a non-use position in which the suction intake port is positioned between the handle and the tip, and a suction use position in which the suction intake port is positioned beyond the tip relative to the handle.

11. The toothbrush of claim 10, wherein the bristle actuator includes a motor coupled to the plurality of bristles by a shaft extending between the interior of the handle and an interior of the head.

12. The toothbrush of claim 10, wherein the suction coupler includes a tube fitting configured to couple to a tube of the suction source, and a suction ventilation port configured to permit a user to selectively control suction from the suction source to the suction intake port by covering or uncovering the suction ventilation port.

13. The toothbrush of claim 12, wherein the handle includes an interaction device configured to control the bristle actuator, and the interaction device and the suction ventilation port are disposed on opposite sides of the toothbrush.

14. A toothbrush comprising:

a head removably attached to a handle at a proximal end and including a plurality of bristles at a distal end;

a motor assembly disposed in an interior of the handle and coupled to the plurality of bristles via a shaft extending into the head; and a suction passage extending between a suction inlet and a suction outlet, the suction outlet being configured to couple to a vacuum source;

wherein the suction passage is coupled to the handle externally, such that the suction passage is configured to slide relative to the handle and externally to the head to adjust a position of the suction inlet relative to the distal end of the head, and the suction passage is isolated from fluid communication with the interior of the handle; and wherein the head includes a body extending between the proximal end and the distal end, and wherein the suction passage is coupled to the handle externally, such that a majority of the body, the suction passage, and the handle are exposed to an external environment.

15. The toothbrush of claim 14, wherein the suction passage has a ventilation port between the suction inlet and the suction outlet, such that sealing the ventilation port facilitates suction into the suction passage at the suction inlet.

16. The toothbrush of claim 15, wherein the ventilation port is disposed on an exterior surface of the toothbrush opposite a user interaction device of the motor assembly, such that a user can seal the ventilation port and operate the user interaction device with a respective thumb and finger of a same hand.

17. The toothbrush of claim 14, wherein the suction passage is disposed entirely outside the interior of the handle.

18. The toothbrush of claim 14, wherein the suction inlet is spaced from the plurality of bristles.

19. The toothbrush of claim 14, wherein the suction passage is configured to slide between a non-use position in which the suction inlet is positioned between the handle and the distal end, and a suction use position in which the suction inlet is positioned beyond the distal end relative to the handle, wherein the suction inlet is exposed to an external environment in both the suction use position and the non-use position.

* * * * *